(12) United States Patent
Naparstek

(10) Patent No.: US 12,499,685 B2
(45) Date of Patent: Dec. 16, 2025

(54) REFRIGERATION SYSTEM WITH IMAGING

(71) Applicant: SNWC, Inc., New York, NY (US)

(72) Inventor: Sam Naparstek, New York, NY (US)

(73) Assignee: SNWC, Inc., New York, NY (US)

( * ) Notice: Subject to any disclaimer, the term of this patent is extended or adjusted under 35 U.S.C. 154(b) by 183 days.

(21) Appl. No.: 18/073,545

(22) Filed: Dec. 1, 2022

(65) Prior Publication Data
US 2023/0168028 A1 Jun. 1, 2023

Related U.S. Application Data

(60) Provisional application No. 63/264,720, filed on Dec. 1, 2021.

(51) Int. Cl.
G06V 20/50 (2022.01)
F25D 25/02 (2006.01)
F25D 29/00 (2006.01)
F25D 31/00 (2006.01)
G06T 7/70 (2017.01)
G06V 10/764 (2022.01)
H04N 23/51 (2023.01)
H04N 23/698 (2023.01)
H04N 23/90 (2023.01)

(52) U.S. Cl.
CPC ........... *G06V 20/50* (2022.01); *F25D 25/024* (2013.01); *F25D 29/00* (2013.01); *F25D 29/005* (2013.01); *F25D 31/007* (2013.01); *G06T 7/70* (2017.01); *G06V 10/764* (2022.01); *H04N 23/51* (2023.01); *H04N 23/698* (2023.01); *H04N 23/90* (2023.01); *F25D 2331/803* (2013.01); *F25D 2700/06* (2013.01)

(58) Field of Classification Search
CPC ...................................................... G06V 20/50
See application file for complete search history.

(56) References Cited

U.S. PATENT DOCUMENTS

D191,551 S 10/1961 Duesenberg
D314,579 S 2/1991 Maxwell et al.
(Continued)

FOREIGN PATENT DOCUMENTS

EP 3712852 9/2020
JP 2003042626 A 2/2003
JP 2022042854 A 3/2022

OTHER PUBLICATIONS

[No Author Listed] [online], "DIY 'Samsung Family Hub' Refrigerator with Raspberry Pi + Camera !!!", Jun. 11, 2016, retrieved on Feb. 1, 2023, retrieved from URL<https://www.youtube.com/watch?v=u3Jkv3x18W4>, 4 pages [Video Submission].

(Continued)

Primary Examiner — Irfan Habib
(74) Attorney, Agent, or Firm — Fish & Richardson P.C.

(57) ABSTRACT

In examples, a refrigeration system includes one or more cameras that are positioned to capture images of items before the items are positioned inside the cabinet. The refrigeration system can include one or more moveable racks on which items can be placed. When the rack is moved out, items can be placed on the rack, and the set of cameras can image the rack to determine information about the items placed on the rack.

16 Claims, 16 Drawing Sheets

(56) References Cited

U.S. PATENT DOCUMENTS

| | | | | |
|---|---|---|---|---|
| 5,340,209 | A | * | 8/1994 | Kolbe ................ F25D 25/024 312/334.46 |
| 7,380,410 | B2 | * | 6/2008 | Rand ................ F25D 23/021 312/301 |
| D627,855 | S | | 11/2010 | Ito |
| 9,255,730 | B2 | | 2/2016 | Lee et al. |
| 9,995,528 | B1 | * | 6/2018 | Ebrom ................ H04N 23/64 |
| 10,089,520 | B2 | * | 10/2018 | Motukuri ............. H04N 23/66 |
| 10,330,377 | B2 | * | 6/2019 | Klingshirn ........... F25D 27/00 |
| 10,346,796 | B2 | * | 7/2019 | Giacomini ........... F25D 29/008 |
| 10,474,987 | B2 | | 11/2019 | Corona et al. |
| 10,641,543 | B2 | * | 5/2020 | Yeh ................ F25D 23/12 |
| 10,648,726 | B2 | * | 5/2020 | Im ................ F25D 25/024 |
| 10,670,327 | B1 | * | 6/2020 | Haenssler ............ F25D 25/02 |
| D908,146 | S | | 1/2021 | Kim et al. |
| 10,941,976 | B2 | * | 3/2021 | Kim ................ F25D 29/005 |
| 11,016,634 | B2 | * | 5/2021 | Agboatwalla ...... G06Q 30/0641 |
| 11,079,171 | B2 | * | 8/2021 | Marinello ........... F25D 23/085 |
| 11,343,418 | B2 | * | 5/2022 | Carlotto ............ G06F 16/51 |
| 11,500,574 | B2 | * | 11/2022 | Xia ................ G01R 33/072 |
| D991,987 | S | | 7/2023 | Otake |
| 11,750,909 | B2 | * | 9/2023 | Carlotto ............ H04N 23/51 348/143 |
| D1,004,636 | S | | 11/2023 | Rhein et al. |
| 11,844,443 | B1 | * | 12/2023 | Rolek ................ A47F 3/002 |
| D1,025,140 | S | | 4/2024 | Chen et al. |
| D1,056,970 | S | | 1/2025 | Ahmed |
| 2006/0218958 | A1 | * | 10/2006 | Rand ................ F25D 11/022 62/302 |
| 2014/0092013 | A1 | * | 4/2014 | Hildreth ............ G06F 3/017 345/157 |
| 2014/0126829 | A1 | * | 5/2014 | Seeley ............ G06V 20/20 382/218 |
| 2016/0021342 | A1 | * | 1/2016 | Aso ................ H04N 7/183 702/150 |
| 2016/0033194 | A1 | * | 2/2016 | Sumihiro ............ F25D 23/04 62/125 |
| 2016/0123658 | A1 | | 5/2016 | Kim et al. |
| 2016/0138857 | A1 | * | 5/2016 | Klingshirn ........... F25D 29/00 62/130 |
| 2016/0146519 | A1 | | 5/2016 | Ito |
| 2016/0201981 | A1 | * | 7/2016 | Kempfle ............ F25D 29/00 62/125 |
| 2017/0205138 | A1 | * | 7/2017 | Hwang ............ G06Q 10/087 |
| 2020/0020075 | A1 | * | 1/2020 | Khwaja ............ G06T 5/70 |
| 2020/0256613 | A1 | * | 8/2020 | Kim ................ F25D 23/025 |
| 2021/0049775 | A1 | | 2/2021 | Ryu et al. |
| 2022/0187008 | A1 | | 6/2022 | Werner et al. |
| 2022/0325946 | A1 | * | 10/2022 | Schroeder ........... G06N 3/096 |
| 2023/0058922 | A1 | * | 2/2023 | Schroeder ........... H04N 7/181 |
| 2023/0154029 | A1 | * | 5/2023 | Ha ................ H04N 23/60 348/139 |
| 2023/0169772 | A1 | * | 6/2023 | Naparstek ........... H04N 23/698 348/36 |
| 2023/0308611 | A1 | * | 9/2023 | Schroeder ........... H04N 5/265 |
| 2023/0332830 | A1 | | 10/2023 | Horii et al. |
| 2023/0375258 | A1 | * | 11/2023 | Chung ................ F25D 29/005 |
| 2024/0151463 | A1 | * | 5/2024 | Engstler ............ F25D 29/00 |
| 2024/0240853 | A1 | | 7/2024 | Avakian et al. |
| 2024/0257388 | A1 | * | 8/2024 | Bolognesi ........... G06T 7/337 |

OTHER PUBLICATIONS

International Preliminary Report on Patentability in International Appln. No. PCT/US2022/51590, issued on May 2, 2024, 12 pages.
International Search Report and Written Opinion in International Appln. No. PCT/US2022/51590, mailed on Apr. 10, 2023, 16 pages.
Extended European Search Report in European Appln No. 22902205.8, dated Feb. 20, 2025, 14 pages.
Extended European Search Report in European Appln No. 22902205.8, dated Jun. 11, 2025, 14 pages.

* cited by examiner

```
┌─────────────────────────────────────────────────────────────────────────┐
│ Perform, Using Images Of A First Camera Set, a First Image Processing On A Rack That Is │
│ Moved Into Interior Storage Space Of Refrigeration Assembly      310    │
└─────────────────────────────────────────────────────────────────────────┘
                                    │
                                    ▼
┌─────────────────────────────────────────────────────────────────────────┐
│ Perform, Using A Second Camera Set, a Second Image Processing On A Second Rack That Is │
│ Moved Into Interior Storage Space Of Refrigeration Assembly      312    │
└─────────────────────────────────────────────────────────────────────────┘
```

FIG. 3A

```
┌─────────────────────────────────────────────────────────────────────────┐
│ Detect A Rack Of Refrigeration Assembly Being Moved From Extended Position To A │
│ Seated Position Within Interior Of The Refrigeration Assembly    320    │
└─────────────────────────────────────────────────────────────────────────┘
                                    │
                                    ▼
┌─────────────────────────────────────────────────────────────────────────┐
│ As The Rack Is Moved Into Interior Storage Space, Capture One Or More Images Of The │
│ Rack                                                             322    │
└─────────────────────────────────────────────────────────────────────────┘
                                    │
                                    ▼
┌─────────────────────────────────────────────────────────────────────────┐
│ Initiate Performance Of Image Analysis To Determine Information About Item(s) Placed On │
│ The Rack                                                         324    │
├─────────────────────────┬───────────────────────┬───────────────────────┤
│ Determine Type Of Item  │ Determine Position Of │ Determine Information │
│                         │ Item                  │ About Item Using Object│
│                    325  │                   326 │ recognition       327 │
└─────────────────────────┴───────────────────────┴───────────────────────┘
```

FIG. 3B

REFRIGERATION SYSTEM WITH IMAGING

CROSS-REFERENCE TO RELATED APPLICATIONS

This application claims benefit of priority to Provisional U.S. Patent Application No. 63/264,720; filed Dec. 1, 2021; the aforementioned priority application being hereby incorporated by reference in its entirety.

BACKGROUND OF THE INVENTION

Refrigeration units are commonplace in homes. In recent years, specialized refrigeration units have been developed for specific types of perishable and consumable goods. For example, freezers exist to store frozen items (e.g., meat). Beverage coolers allow people to maintain beverages in colder temperatures. Wine coolers referred to a general class of refrigeration assemblies which are designed specifically to maintain wine bottles and other beverages. Wine coolers typically include racks that can be extended outward to enable placement of bottles. This allows for the wine cooler to keep bottles on their side (as is customary).

BRIEF DESCRIPTION OF DRAWINGS

FIG. 3A through FIG. 3C illustrate example methods for operating a refrigeration system, according to one or more embodiments.

DETAILED DESCRIPTION

Figure 1A:
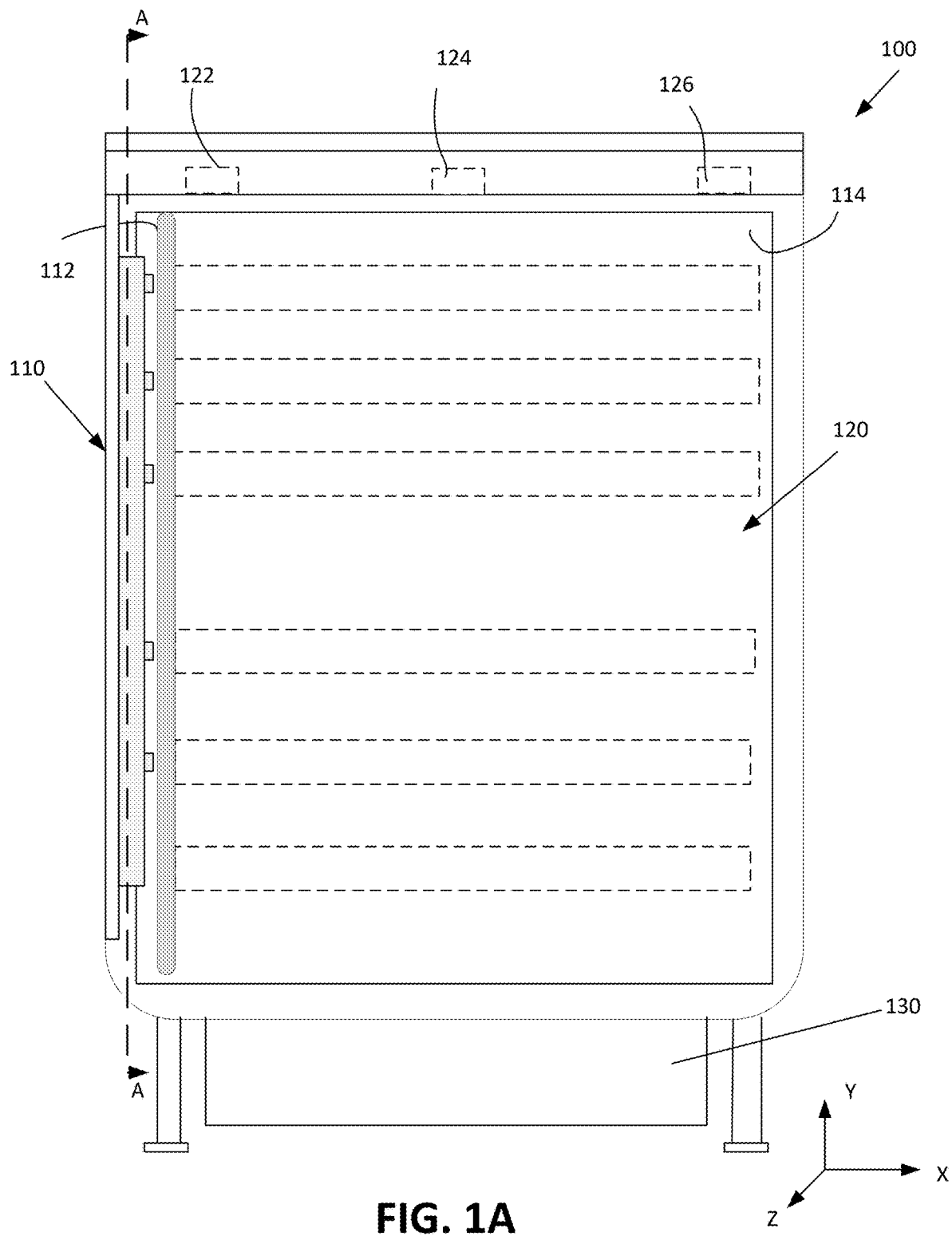
FIG. 1A is a frontal view of a refrigeration system in a closed orientation, according to one or more embodiments.

Embodiments include a refrigeration assembly or system (referred herein as "refrigeration system" for convenience (that utilizes a set of cameras to image items when the items are placed on a rack that is extended out of an interior space of the refrigeration system. For example, one or more cameras of the refrigeration system can image items on a rack, such as when the rack is extended or being pushed into a seated position. The refrigeration system can initiate image processing and analysis to determine information about the items on the rack. The information can then be transmitted to a user device and/or rendered on a display.

Among other benefits, examples enable a user to know information about items retained within a refrigeration system or appliance. Further, the processing and imaging that is performed can require minimal or no separate actions from a user. For example, the user does not have to handle the items in a particular manner, other than place the items on a rack (preferable label up, if applicable) and push the rack in-actions which the user would do in any case. Thus, the user can avoid tedious tasks such as holding items in front of a camera.

Additionally, examples generate content that enables the user to learn about items stored with a refrigeration system or appliance. In some examples, the refrigeration system or appliance is implemented as a beverage cooler to hold wine, liquor, canned beverages and the like. With wine, for example, users often have a need to know their inventory by type and category (e.g., number of red wines, which vintage, attributes of wine, etc.). Further, users may also want to know which wines have been opened (e.g., so they can drink those first), and the fill level of bottles. Various embodiments enable the user to determine such information without the user having to open the unit, thereby saving user convenience and energy.

In some examples, a refrigeration system is operated by (i) detecting a given rack of multiple racks of the refrigeration system being moved from an extended position to a seated position within an interior of the refrigeration system; (ii) capturing one or more images of the rack; and (iii) initiating performance of, or performing, image analysis of the one or more images to determine information about one or more items that are placed on the rack.

Still further, in examples, a refrigeration system implements operations for performing a first image scan of a first rack using a first set of cameras, where the first image scan is performed when the first rack is outside of an interior space of the refrigeration system, and where a portion of the first rack is a first distance from the first set of cameras. The operations further comprise performing a second image scan of a second rack using a second set of cameras, where the second image scan is performed when the second rack is outside of an interior space of the refrigeration system, and where the second rack isa second distance from the second set of cameras, the second distance being greater than the first distance.

In examples, a camera module is provided for a refrigeration system, where the camera module includes a set of one or more cameras and a housing that can attach to a cabinet or structure of a refrigeration system. In examples, the housing can be structured to secure to a refrigeration system, to position the camera array such that a corresponding viewing angle of one or more cameras of the camera array are positioned over a vertical space that coincides with a thickness that occupies a door of the refrigeration system when the door is in a closed position. The refrigeration system can also include one or more processors, that execute instructions to perform operations that include: (i) capturing one or more images of a rack of the refrigeration system when the rack is extended from an interior cabinet; and initiating performance of image analysis of the one or more images to determine information about one or more items that are placed on the rack.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Refrigeration System

Figure 1B:
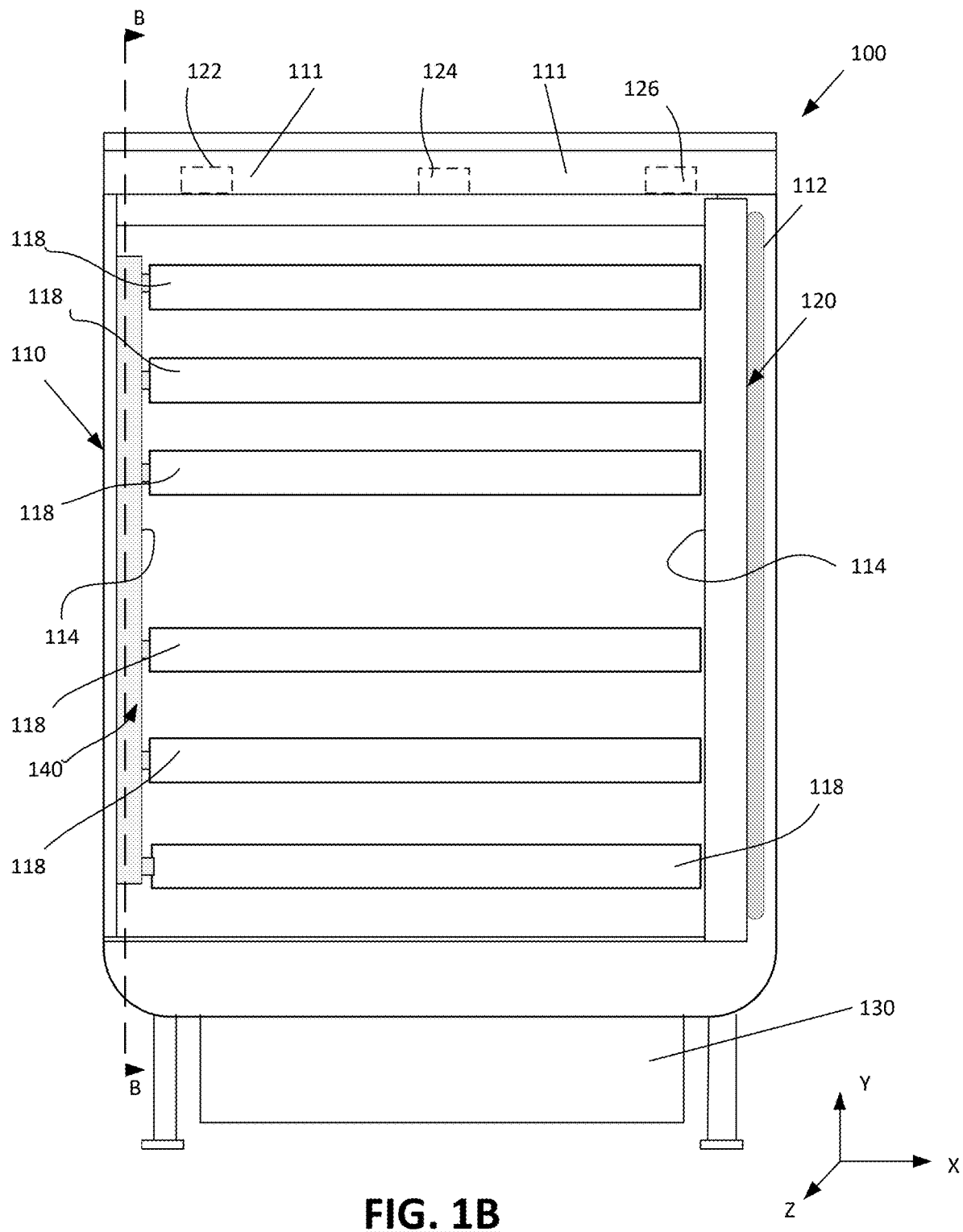
FIG. 1B is a frontal view of the refrigeration system of FIG. 1A in the closed orientation, according to one or more embodiments.
Figure 1C:
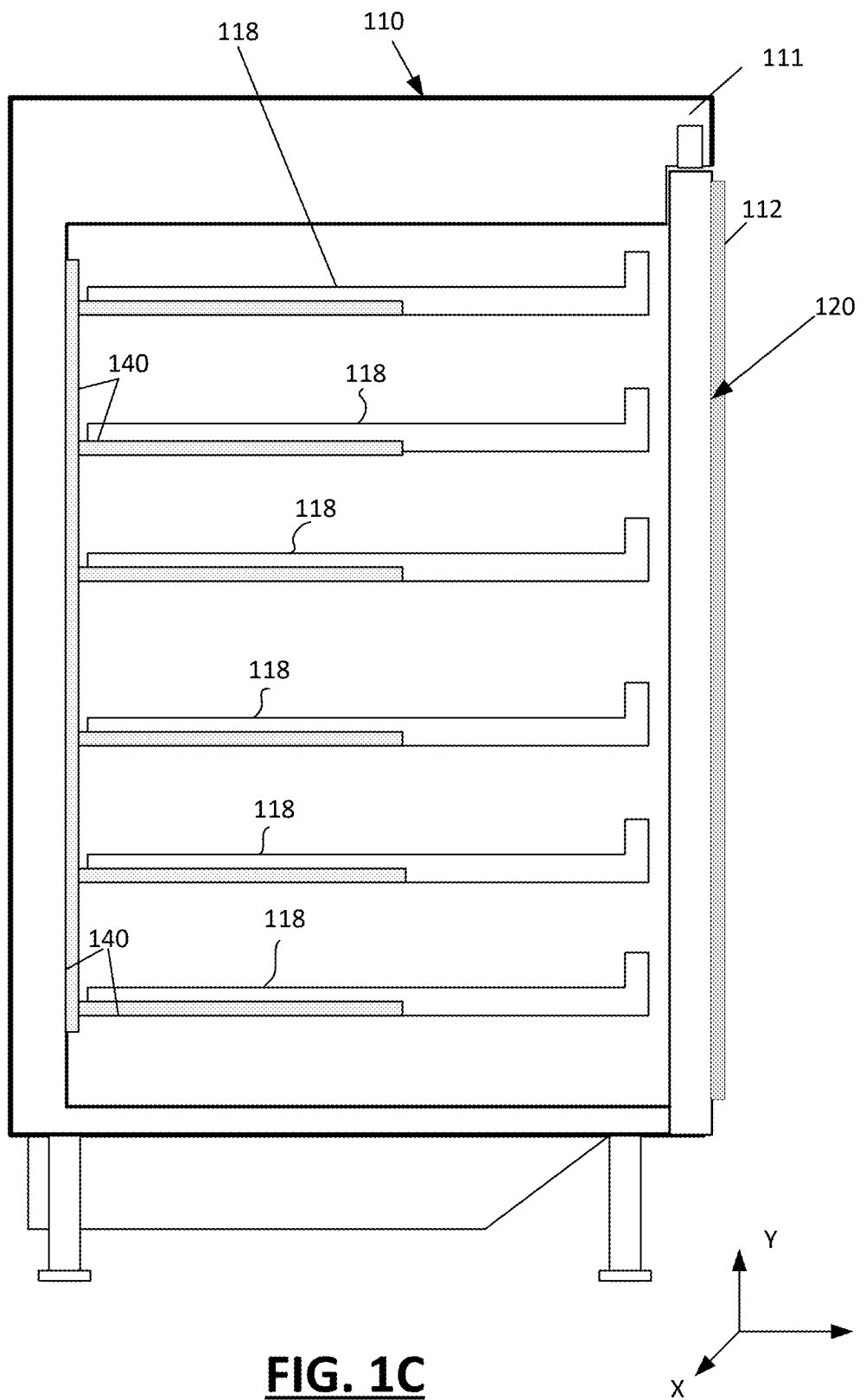
FIG. 1C is a side cross-sectional view of the refrigeration system in the closed orientation, along lines A-A of FIG. 1A, according to one or more embodiments.
Figure 1D:
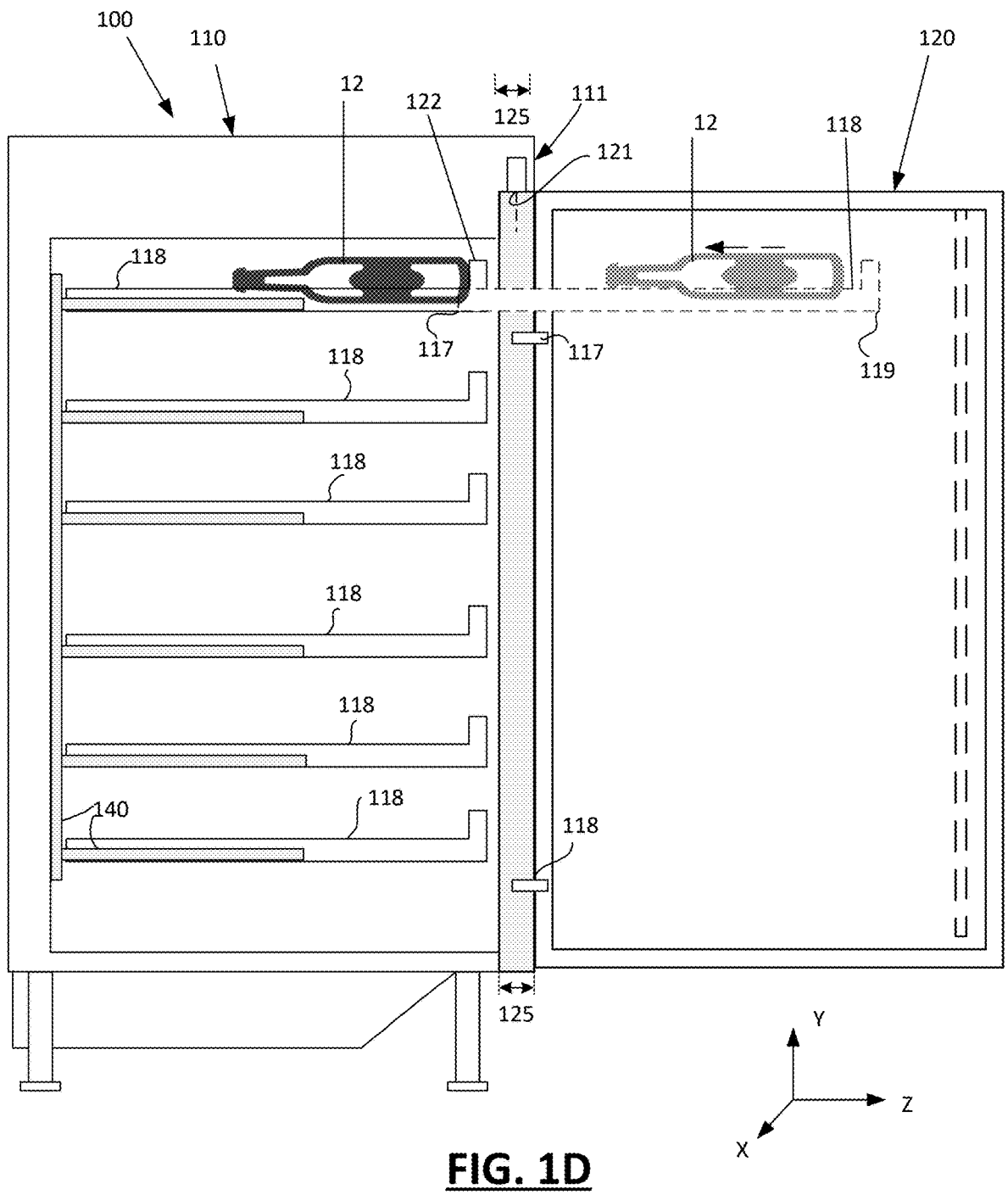
FIG. 1D is a side cross-sectional view of the refrigeration system in the open orientation, along lines B-B of FIG. 1B, according to one or more embodiments.

FIG. 1A is a frontal view of a refrigeration system (or assembly) in a closed orientation, according to one or more embodiments. FIG. 1B is a frontal view of the refrigeration system of FIG. 1A in the closed orientation, according to one or more embodiments. FIG. 1C is a side cross-sectional view of the refrigeration system 100 in the closed orientation, along lines A-A of FIG. 1A, according to one or more embodiments. FIG. 1D is a side cross-sectional view of the refrigeration system 100 in the open orientation, along lines B-B of FIG. 1B, according to one or more embodiments. A refrigeration system 100, as shown and described by examples of FIG. 1A through FIG. 1D, can correspond to a beverage cooler, with structural and functional features that are optimized for maintaining wine bottles and beverages in a suitable environment. In variations, embodiments can be employed with other types of refrigeration systems. As described in greater detail, the refrigeration system 100 is configured to perform image processing and analysis to determine information about items and content stored within the refrigeration system 100.

With reference to FIG. 1A, the refrigeration system 100 includes a cabinet 110, a door 120 and a cooling subsystem 130. When the refrigeration system 100 is closed, the door 120 is in the closed position, where an interior space of the cabinet is sealed by the door 120. In examples, the door 120 includes an exterior facade and an optional handle 112. To open the door 120, a user can pull the handle 112, so that the door swings outward, to provide the user with access to the interior space of the cabinet 110.

To accommodate wine bottles, and more generally beverage containers, an interior space 114 of the refrigeration system 100 includes racks 118 that are movable laterally outwards (in the Z direction) when cabinet 110 is in the open position. The interior space 114 is maintained at a desired temperature for cooling items on racks 118. As a beverage cooler, the interior space 114 can be maintained at temperatures that range between, for example, 33° F. and 70° F. As a wine cooler, the interior space 114 can be maintained at temperatures that range between 44° F. and 65° F. Thus, the specific temperature can be selected by user preference and/or the type of item being stored. Still further, in other examples, the temperature setting can be set automatically based at least in part on one or more items placed on the rack. For example, as described with examples, the cameras 122, 124, 126 can be operated to determine information about the items, such as the type or item (e.g., type of beverage or wine, manufacturer or source of wine, fill state of beverage), etc. The refrigeration system 100 can include one or more processor(s) 220 (see FIG. 2A) that can process images of the items to determine the information, and automatically implement operations to control the operation of the refrigeration system 100 based on the detected information.

The cabinet 110 includes a top segment 111 that integrates or otherwise provides a camera array, where the camera rate includes cameras 122, 124 126. While in examples shown, the camera rate includes three cameras, in variations more or fewer cameras may be used. Each camera can include a lens, or combination of lenses, combined with an optical sensor and processing resources for generating image data using light captured by the optical sensors. As further described, the camera 122 is proximate (i.e., closest to) to left side 101 of the cabinet 110, and camera 126 is proximate to a right side 103 of the cabinet 110. The cameras 122, 126 can be of the same type, and the camera 124 may be of a different type. For example, the cameras 122, 126 can incorporate wide angle lenses, such as fisheye lenses, while the camera 124 includes a high definition lens. The cameras 122, 126 can be selected to determine information about items and contents stored with racks 118 that are closest to the lenses of the camera array.

With reference to FIG. 1B, the door 120 is shown in an open position, to provide access to an interior space 114 of the cabinet 110. The rack subassembly 140 is mounted to an interior of the cabinet, where the rack subassembly 140 maintains multiple racks 118 that can be moved laterally (e.g., in Z direction) in and out of the cabinet (or between a seated position and an extended position) while the door 120 is in the open position. As described in greater detail, the rack assembly 140 enables individual racks 118 to be slid out. When a given one of the racks 118 is slid out, the user can place bottle(s) on the rack 118, remove bottle(s) (e.g., for consumption) from the rack 118, reposition bottles on the rack 118, add bottles to the rack 118, and/or remove a bottle for partial consumption and then return it to the rack 118. The user can then slide the rack back in two the interior space 114 of the cabinet 110. As described in greater detail, the array of cameras 122, 124, 126 operate to capture images of the items on any one of the racks that is being returned to the seated position.

With reference to a cross-sectional view shown FIG. 1C (door in closed position), the cameras 122, 124 (not visible in FIG. 1C), and 126 (not visible in FIG. 1C) a provided in the top segment of the cabinet 110. Each camera 122 124, 126 is oriented downward, such that the field of view of the respected lens(es) is blocked by the thickness of the door 120. In examples as shown, the cameras 122, 124, 126 are not positioned within the interior space, where, for example, the top rack 118 occludes other racks. Rather, the cameras are position over the door 120, so that when the door is open and racks are slid in and out, the cameras 122, 124, 126 can capture images of the racks for processing.

With reference to a cross-sectional view shown FIG. 1D (door in open position), each rack 118 is movable laterally (in the Z direction) to provide a user with access to items that are held by that rack. The cameras 122, 124 (not visible in FIG. 2D), 126 (not visible in FIG. 2D) are oriented downward such that the downward viewing angle coincides or overlaps with a space that is occupied by a thickness of the door 120 when the door is in the closed position.

In examples, each camera 122, 124, 126 of the camera array is mounted within a frontward and top region 128 of the cabinet 110. The top segment 128 can be an integral or unitary housing segment cabinet 110. In other examples, the top segment 128 can be a void where the cameras 122, 124, 126 can be mounted and accessed. Each camera 122, 124, 126 of the camera array is mounted within the top segment 128, with lens oriented downward. In examples, the cameras are aligned so that a vertical field of view (in Y direction) of the respective cameras includes, or otherwise coincides with a space 125 that occupies a thickness of the door 120 when the door is in the closed position. In examples, the cameras 122, 124, 126 can be mounted to be flush, or extend outward from a surface of the 121. For example, the 121 can be in the form of a surface with openings to accommodate the lenses of the individual cameras 122, 124, 126. Alternatively, some or all of the lenses may protrude from the respective openings. Still further, the cameras 122, 124, 126 can be mounted to a swing arm and moved into and out of position.

In an example shown by FIG. 1D, a user places a bottle 12 on a top rack 118 when the rack is slid outward into the extended position 119. As the rack 118 is slid inward, the bottle passes across the field of view of the cameras 122, 124, 126 before the rack is returned to the seated position 117, and the cameras 122, 124, 126, capture images (e.g., video frames) of the bottle 12. Additionally, the cameras 122, 124, 126 can be configured to capture images of the rack 118 when it static, or moved outward from the cabinet 110.

As shown with an example of FIG. 1D, embodiments enable for image capture and processing of bottle 12 with minimal or no additional user interaction, other than the user placing the bottle 12 on the desired rack 118. Further, because of the configuration of the camera array, the camera array is able to capture recognizable images of the bottle even as the bottle is passed within a relatively short distance of the cameras 122, 124, 126. Additionally, the camera array can equally capture recognizable images of items position on other racks, as each rack can be slid into the interior space 114 of the cabinet 110 individually.

While examples as described illustrate the rack 118 supporting the item (e.g., bottle) in a first orientation (e.g., lengthwise along Z axis), in variations, the rack 118 can be configured to alternatively, or additionally, support items in an alternative orientation (e.g., widthwise along Z axis).

Figure 1E:
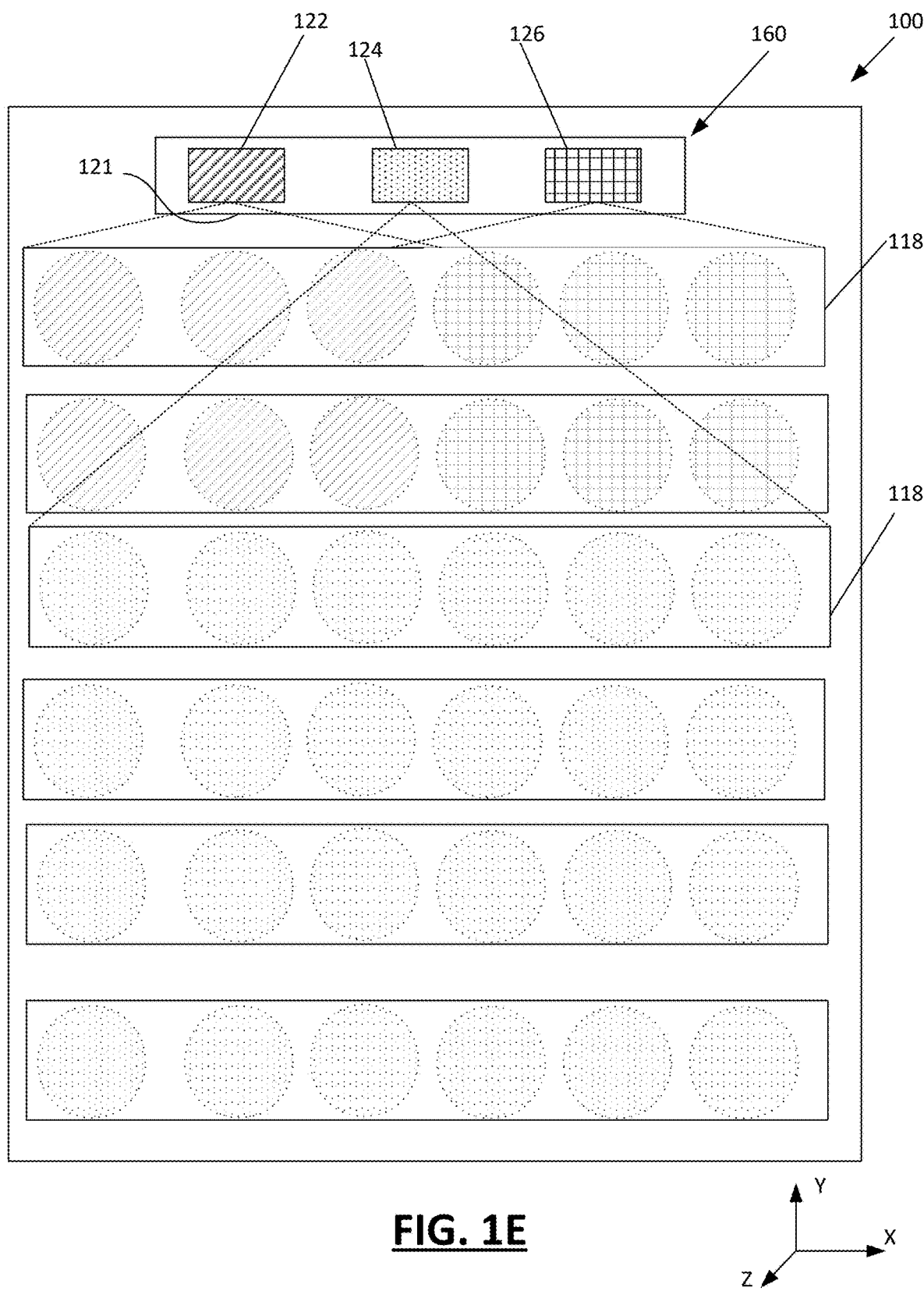
FIG. 1E is a simplified diagram of viewing angles used by a camera array of a refrigeration system shown by FIG. 1A through FIG. 1D, according to one or more embodiments.

FIG. 1E is a simplified diagram of viewing angles used by a camera array of the refrigeration system 100, according to one or more embodiments. While examples described provide for the camera array 160 to include 3 lenses, in variations, more or fewer cameras may be utilized. In some examples, the camera array 160 includes multiple cameras 122, 124, 126, each having a lens that is exposed at a bottom-facing plane 121 or opening of the cabinet 110. The individual cameras of camera array 160 can be operated in sets of one or more cameras, where each set is a prioritized or primary source for obtaining recognizable images of items placed on corresponding racks 118 or regions thereof. Based on implementation, one camera of the camera array 160 can be used in multiple sets. In some variations, the individual cameras of each camera set are preconfigured, or dynamically controlled, to operate in a coordinated fashion, such as to obtain images simultaneously.

Accordingly, in examples, the camera array 160 includes or otherwise provides alternative camera sets for imaging specific racks 118 based on the vertical distance of the respective racks and the lenses of the cameras (which for purpose of discussion here, are assumed to be coplanar with the 121). In examples, a distance between the 121 and the top-most rack can be in the range of 40-75 mm. Likewise, a distance between the 121 and the second rack (from the top) may range between 120-180 mm, and a distance between the third from the top can be in the range of 200-250 mm. Still further, in other variations, the operation of the camera sets, including the selection, operation and/or configuration of cameras, can based on switching elements that are triggered by movement of the racks 118.

Embodiments recognize that different camera sets may enable or facilitate the operations of obtaining recognizable image data from each rack 118 when such racks are used. For items placed in the top rack 118, the proximity of the top rack with the 121, combined with a standard field-of-view of a camera lens, would otherwise limit a span of a camera's coverage in the X-direction. Further, the ability of the camera to focus on items in such proximity may be limited. Similarly, items placed on the second rack can have similar challenges with respect to imaging by the camera array—the field-of-view from a single camera does not span (in the X-direction) the entire width of the rack, and the items placed on the second rack may be too close to the respective cameras to enable sufficient focus.

For middle or bottom racks 118, the field-of-view for cameras may present a lesser requirement with respect to the field of view that would otherwise be required from an imaging camera. However, the vertical distance between the respective cameras and the racks may pose an additional challenge with respect to obtaining images with adequate definition of text that can be subsequently recognized using optical character recognition (OCR).

Additionally, the camera array 160 can be configured to accommodate additional optimizations. Specifically, the camera array 160 can include a minimal number of cameras to image a full span of each rack with sufficient definition to enable subsequent image recognition (e.g., OCR) and other image processing to be performed. For spacing as described, one optimal configuration for camera array 160 provides for placement of ultra-wide lens cameras 122, 126 towards respective left and right lateral sides of the cabinet 110, to capture images of items placed on the top two racks 118. Further, a camera (e.g., HD camera) can be positioned as the middle of the camera array to capture images of items placed on other racks. In other variations, an HD camera can be positioned towards the lateral ends of the camera array 160 (e.g., as cameras 122, 126).

In one implementation, the cameras 122, 126 have a field of view that is greater than 180° (e.g., fisheye camera lenses), with video recording capability, while the mid-camera 124 can be selected to have a field-of-view between 70 and 100 degrees, with high definition video capture capabilities.

While numerous examples illustrate the cameras 122, 124, 126 positioned in a top segment or area of the refrigeration system 100 with a downward viewing angle, in variations, the cameras 122, 124, 126 can be positioned in a bottom segment or area and configured so the viewing angle is upwards.

Retrofit Alternatives

Figure 1F:
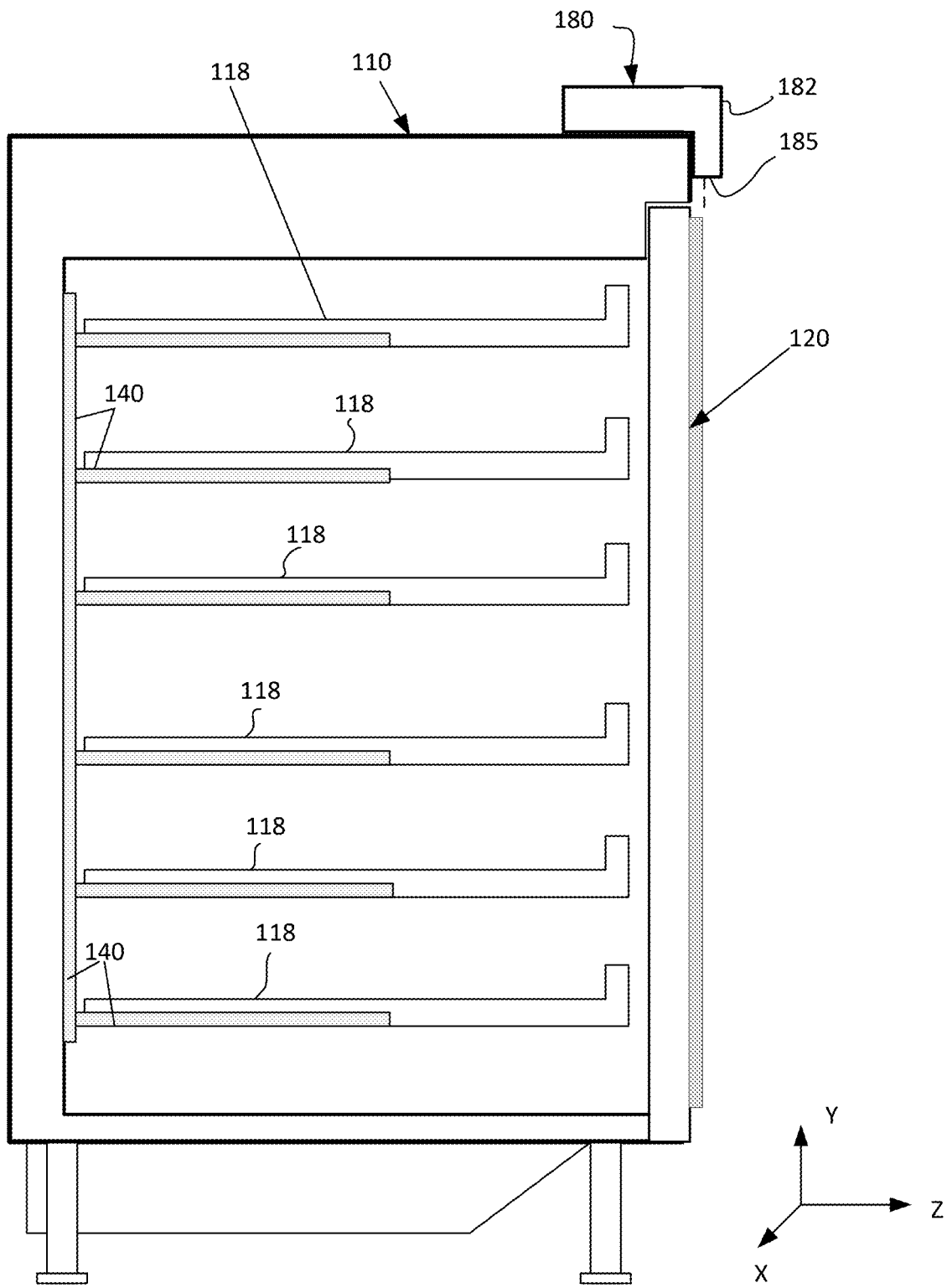
FIG. 1F illustrates a variation in which an example refrigeration system is implemented to include a camera module as a retrofit, according to one or more embodiments.

FIG. 1F illustrates a variation in which the refrigeration system 100 is implemented to include a camera module 180, where the camera array 160 is housed. In examples, a refrigeration system 100 includes a camera module 180 having a housing 182 that is separate from a structure of the refrigeration system 100. For example, the camera module 180 can be affixed to a top surface of the refrigeration system, with the lens surface 185 of the camera array positioned to be in front of/or over the door 120. As with other examples, camera module 180 can include alternative sets of cameras 122, 124, 126, dispersed lengthwise (along X direction) of the cabinet 110. Thus, the lens surface 185 positions the cameras 122, 124, 126 (e.g., see FIG. 1E) so that he field of each camera includes a vertical thickness that is in front of the door. Further, based on orientation of the cameras and lens configuration, the field of views of the respective cameras can also overlap a vertical thickness that is occupied by the door 120. Thus, when the door 120 is opened and racks are moved in front of the cameras (underneath the lens surface 185), the cameras of the camera can image the respective rack.

Figure 1G:
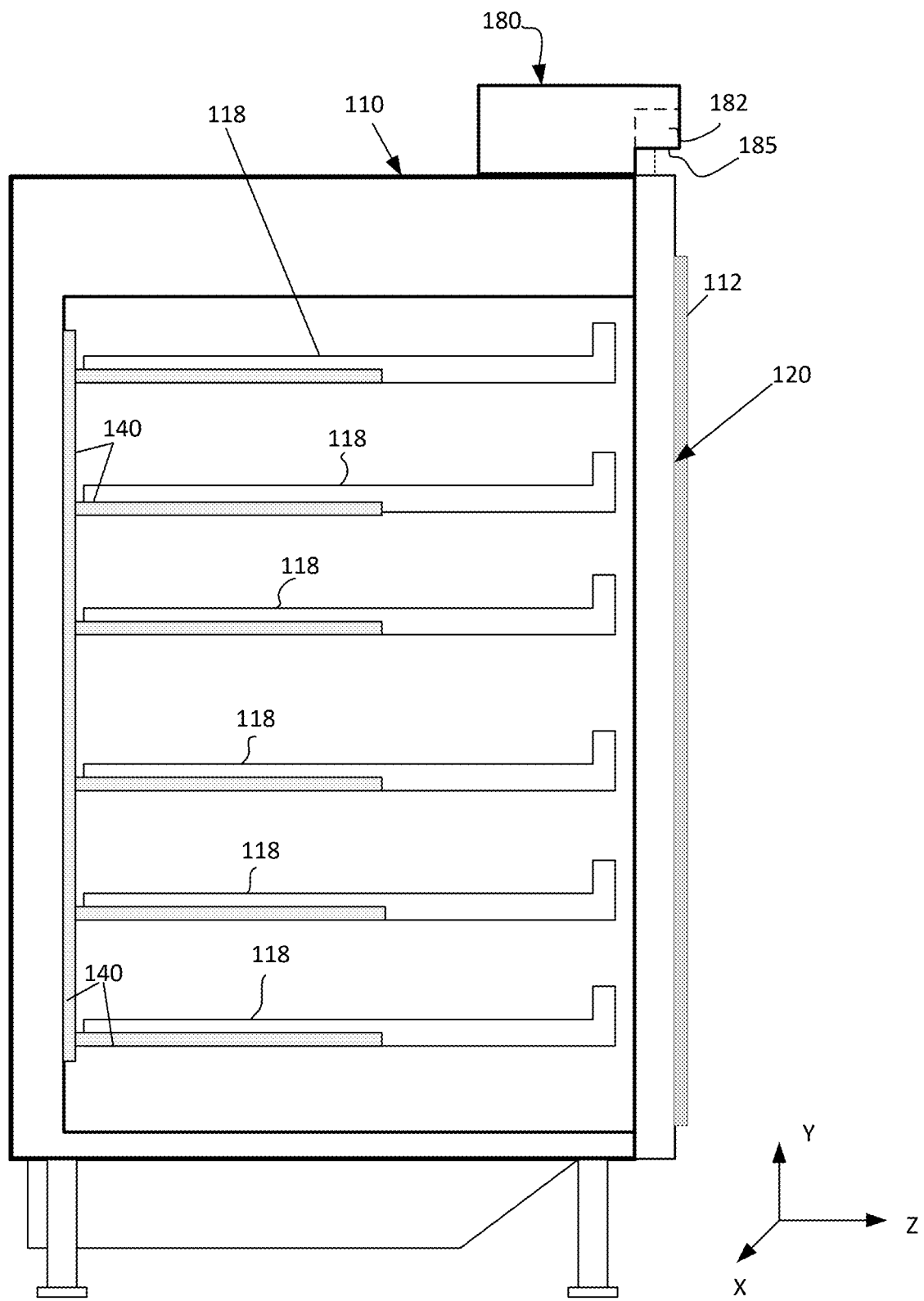
FIG. 1G illustrates another variation in which an example refrigeration system is implemented coupled with the camera module 180, where the camera array 160 is housed.

FIG. 1G illustrates another variation in which the refrigeration system 100 is implemented to include the camera module 180, where the camera array 160 is housed. In an example of FIG. 1G, the door 120 of the refrigeration system 100 spans a height of the refrigeration system 100. In such examples, the housing 192 of the camera module 180 can be structured to position the camera array such that the lens surface 185 is substantially aligned or in front of a vertical thickness occupied by the door 120.

Still further, in other variations, the camera module 180 can be partially positioned within the cabinet 110, with an extension to house the camera array extending to the outside of the cabinet, such as in an orientation shown.

While numerous examples are described with FIG. 1A through FIG. 1G which provide for the cameras of the camera array to capture images when a corresponding rack is extended from the cabinet 110, in variations, an item may be entered onto the rack 118 without moving the rack our of the cabinet 110. For example, the user can reach a bottle into a rack while the rack remains seated. In such examples, the cameras can detect the item and capture the item as it is placed on the rack 118. Still further, in some variations, the camera module 180 can be manufactured as an accessory item for suitably configured refrigeration systems.

Refrigeration System Hardware

Figure 2A:
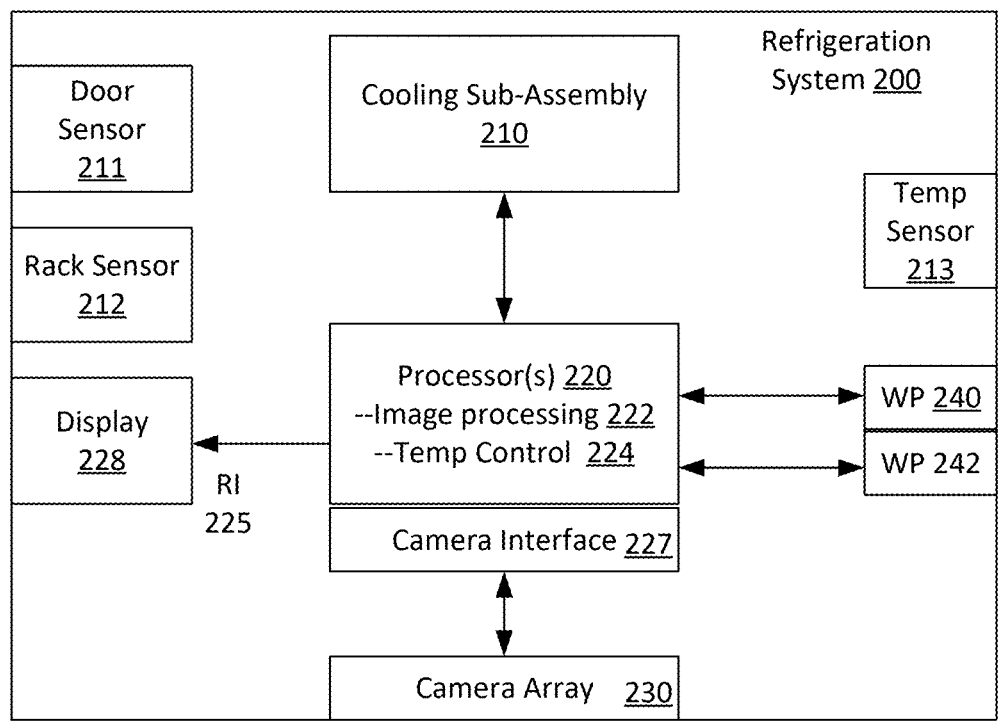
FIG. 2A is a hardware diagram of an example refrigeration system, according to one or more embodiments.

FIG. 2A is a hardware diagram of an example refrigeration system, according to one or more embodiments. A refrigeration system 200 of FIG. 2A can be configured in accordance with examples such as described with FIG. 1A through FIG. 1E. Accordingly, the refrigeration system 200 provides an example of refrigeration system 100, as described with other examples in this document, and reference made to elements of FIG. 1A through FIG. 1E illustrate suitable or like elements of the refrigeration system 100, in context of refrigeration system 200.

With further reference to an example of FIG. 2A, the refrigeration system 200 includes a cooling subassembly 210, one or more processors 220, a camera interface 227 and/or a camera array 230. Additionally, the refrigeration system 200 can include one or multiple communication ports 240, 242. The communication ports can include wireless ports. For example, one of the communication ports 240 can enable local device-to-device communications, using, for example, a Bluetooth protocol, and another of the communication ports 242 can enable network/Internet communications, such as through WiFi (e.g., wireless communications as promulgated under 802.11(g), 802.11(n), 802.11 (ac), etc.), cellular communications or other wireless communication protocols.

The cooling subassembly 210 includes a compressor unit, coolant handling mechanisms and other components for cooling an interior space 114 (see FIG. 1A through FIG. 1E) of the cabinet 110 (see FIG. 1A through FIG. 1E). In examples, the cooling subassembly 210 can include a compressor, evaporator, coolant lines, and temperature/power control to enable cooling of the interior space 114 of the refrigeration system 100.

In examples, the one or more processors ("processor(s) 220") control the operations of the refrigeration system 200, including control of the cooling subassembly 210, while providing image control and/or processing functionality. The processor 220 receives, via the camera interface 227, image data captured through individual cameras of the camera array 230. In some examples, the camera array 230 is an integrated component set of the refrigeration system 200, meaning the camera array 230 is provided with the refrigeration system 200 at time of manufacturing or assembly. In variations such as described with examples of FIG. 1F and FIG. 1G, the camera array 230 may be provided as a separate module or component that is affixed to the housing of the refrigeration system 200 after manufacturing. In such examples, the processor(s) 220 can also be distributed or located with the camera module 180 (see FIG. 1F and FIG. 1G).

In some examples, the refrigeration system 200 includes or is connected to camera interface 227 to enable subsequent use of cameras, as described with various examples. For example, the refrigeration system 200 can be manufactured to include ports for connecting the camera array 230, or individual cameras. Subsequently, the camera array 230 can be added as an option during distribution, at point-of-sale, or by user (e.g., post-sale). When manufactured separately, the camera array 230 can be modularized, so as to include each camera of the camera array 230. In variations, the individual cameras of camera array 230 can be connected or attached separately, and operated independently by the processor 220.

In examples, refrigeration system 200 can also include sensors or various types, such a (i) a door sensor 211 (to detect when the door is open, closed, in between, etc.); (ii) one or more rack sensors 212, positioned to detect a position and/or movement by each of one or more corresponding racks; and (iii) a temperature sensor 213 to detect the temperature of the interior space, within the interior space 114 of the cabinet 110. In some examples, the processor(s) 220 receives temperature input from the temperature sensor 213 and implements temperature control operations 224 to cause the cooling subassembly 210 to maintain, increase, or decrease the temperature of the interior space 114. In examples, the refrigeration system 200 includes a temperature control interface (not shown) to enable a user to adjust a desired temperature of the interior space 114. In response to a temperature input, the processor(s) 220 can control the cooling subassembly 210 to increase/decrease cooling of the interior space, and the temperature sensor 213 can generate output to enable the processor(s) 220 to implement the temperature control operations 224 to reach the target temperature.

Further, as described with various examples, the processor(s) 220 implements image processing logic 222 to perform various types of image processing operations on racks when the racks are extended from the cabinet 110 (e.g., in the extended position). For example, as described with other examples, the image processing operations can include operations performed in connection with functionality that includes (i) presence detection (e.g., detecting whether items of a particular type are present on one of the racks 118); (ii) object detection, to determine a type of detected item (e.g., whether item placed on rack is a can, a bottle, or other type of beverage); (iii) hue, color contrast and/or opacity analysis (e.g., to determine a fill level or type of fluid within a container); (iv) label detection, to detect a label on a bottle; and/or (v) character and/or image recognition, to scan, for example, lettering and images of a label.

In some examples, processor(s) 220 performs the operations for implementing the aforementioned functionality. In variations, the processor(s) 220 initiate the image processing operations by, for example, performing preliminary image processing steps. As a result of initiating the image processing operations, a normalized image of a label of an item, or alternatively, of the item itself, is transmitted to another computing device, remote system or network service. For example, the processor(s) 220 can implement operations to de-warp images captured by wide-eye (or ultra wide-eye) lens cameras. Dewarping operations can also be performed to normalize roundedness in images, caused by the shape of the bottles. If a rack requires more than one camera to image the items of the rack, the processor(s) 220 can implement operations to normalize and stitch the images of the different cameras. The images may be stitched by, for example, (i) dewarping images captured by multiple cameras, (ii) identifying an overlap region between two or more cameras that image the rack, (iii) removing the overlap region, and (iv) blending the remaining portion of the images. As a result of a process, an image of the label of the item can be extracted and transmitted for further recognition and analysis.

As an addition or variation, the processor(s) 220 performs select image processing operations, to enable or optimize performance of image processing functionality, as described with some examples. The processor(s) 220 may also initiate image processing and analysis by transmitting processed image data via one of the communication ports 240, 242 to a remote computer system or service, to enable additional image processing to be performed by the remote system or service. For example, the processor(s) 220 can capture and transmit image data to a remote service, computer, or computing device, where additional operations for presence detection, item detection, color/hue analysis, label detection and/or image/character recognition are performed.

As another variation, processor(s) 220 can implement image processing logic 222 to receive image data from the camera array 230 and initiate image processing and analysis by retransmitting the image data to another computer system for image processing. Thus, in variations, some or all of the operations for implementing image processing functionality can be performed by another computer system or systems, such as a network service, remote server and/or user mobile device.

In some examples, processor(s) 220 receives and processes images from camera array 230. Further, processor(s) 220 performs different image processing operations for different sets of cameras of the camera array 230. For example, for a first set of cameras that use ultra-wide angle lens cameras, processor(s) 220 implements operations to normalize the images. Still further, processor(s) 220 can normalize the images based on the distance of the rack where the images are captured and the respective lens of the corresponding camera. Still further, the processor(s) 220 can detect the rack in use (e.g., using rack sensor 212, or through image processing), and perform a set of image processing operations based on the detected rack that is in use. Still further, the selected set of operations can also be based on the position of the items that are captured.

Additionally, in some examples, the processor(s) 220 implements image processing logic 222 to stitch images from multiple cameras together, to form a single image of items positioned on a given rack 118. For example, the processor(s) 220 can select images captured by particular combinations of the camera array 230 based on the rack 118 that is in use. For a top rack or top set of racks 118, the camera array 230 can implement image stitching operations, to stitch images of the rack captured by different cameras of the camera array 230 into a single image. The processor(s) 220 can selectively implement image stitching operations based on the particular rack in use and/or the proximity of the camera array 230 to the racks 118. In examples as described, the camera array 230 can utilize ultra-wide lens cameras that are focused for a top rack 118, or top set of racks. The processor(s) 220 implements image processing logic 222 to stitch images from, for example, a laterally positioned pair of ultra-wide lens cameras.

In some examples, the processor(s) 220 responds to the use of a rack (e.g., rack is pulled out, pushed in or left out in an extended position) by capturing multiple images of the rack 118 using individual cameras of the camera array 230. The processor(s) 220 can implement the camera array 230 to select which image processing operations to perform, based on the rack that is detected in use. For example, in response to detecting the top rack 118 in use, the processor(s) 220 can select to use images from cameras that are optimized for the proximity of the top rack (e.g., ultra-wide eye lens cameras). In such implementations, the processor(s) 220 can implement image stitching to capture the entire width (X-direction) of rack 118.

In variations, the refrigeration system 200 includes a display 228 that displays an output that corresponds to or is based on rack information 225. In examples, the display 228 can be touch-sensitive and/or provided with an interactive interface. In some variations, the rack information 225 can be displayed as content to provide the user with information about the contents of the refrigeration system.

In examples, the rack information 225 includes, for example, information about the contents of the interior space 114. In examples, the rack information 225 identifies presence of items (e.g., bottles, beverage containers, etc.), one or more categories of items (e.g., type of beverage or container (e.g., bottle versus can)), sub-category of item (e.g., bottle of red wine versus white wine), state of the items (e.g., partially consumed, unopened, opened, etc.), orientation of item, and/or label information about individual items. Still further, the rack information 225 can identify information about an orientation of the item, such as a relative orientation of a label of a bottle. In such case, the orientation can reflect a determination of whether the label is, for example, (i) upward facing (e.g., so as to be visible to the camera array when the rack is pulled out), (ii) turned sideways, so that a portion of the label is skewed or not visible to the camera array, and/or (iii) turned so that a back label or surface of the item is visible, without much of the front panel. Further, with respect to detected items, the rack information 225 can identify where individual items are located on a given rack (e.g., visually, by coordinates, by slot, etc.). Additional examples of rack information 225, as well as other content which can be rendered with the display 228, are provided with examples of FIG. 2B.

Figure 2B:
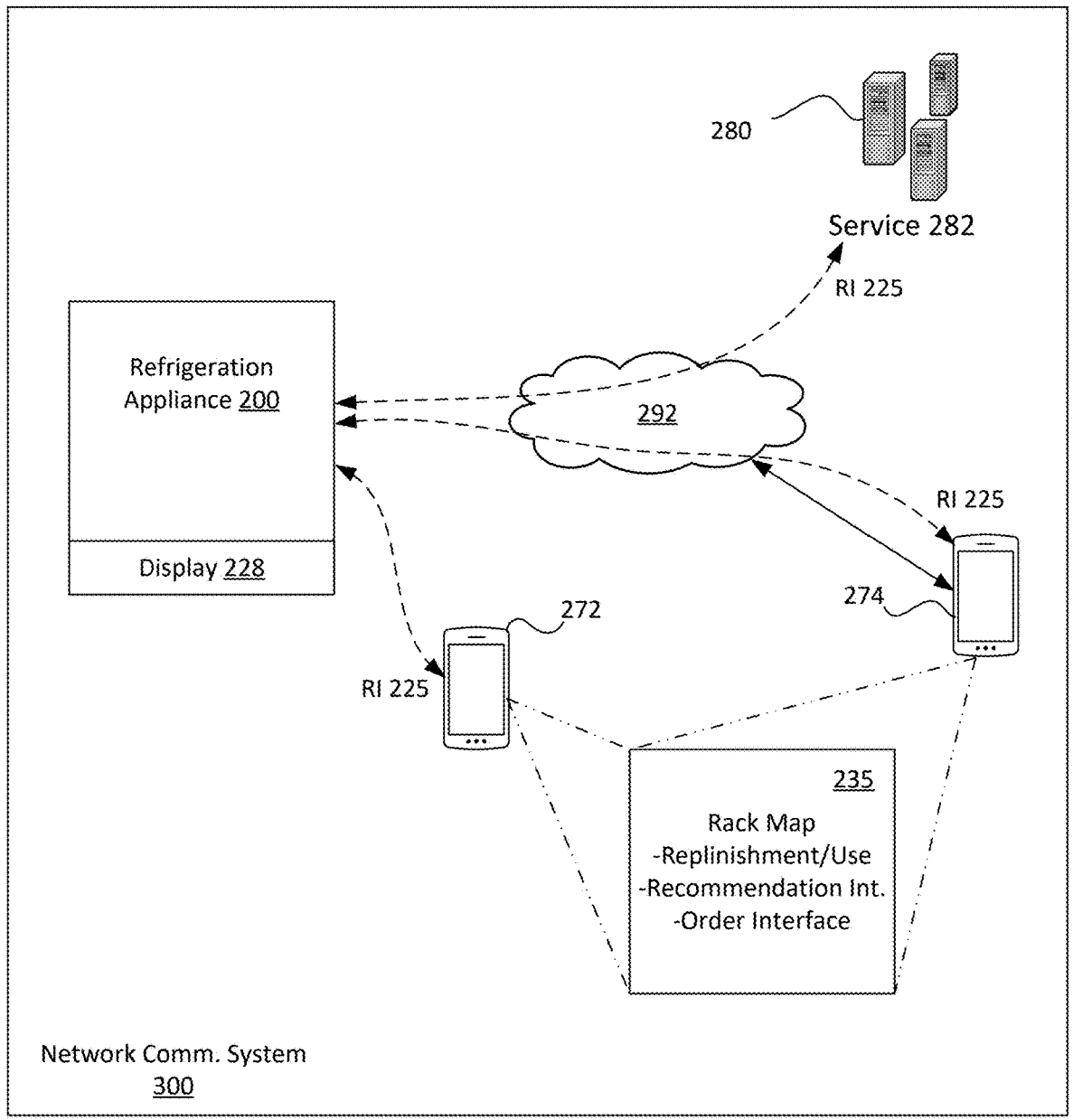
FIG. 2B illustrates a network communication system for providing information about items stored in a refrigeration system, according to one or more embodiments.

FIG. 2B illustrates a network communication system for providing information about items stored in a refrigeration system, according to one or more embodiments. In examples, a network communication system 300 includes refrigeration system 200 and one or more user devices 272, 274, where user devices 272, 274 communicate with the refrigeration system 200 using either a local wireless connection 242 (e.g., Bluetooth) or network connection (e.g., WiFi Direct). In variations, the refrigeration system 200 can communicate with user devices 272, 274 indirectly, via a network service, server or remote computer.

Accordingly, in some examples, network communication system 300 includes one or more servers 280 or other remote computer systems. In variations, the server(s) 280 implement or otherwise provide a network service 282 that utilizes rack information transmitted by the refrigeration system 200, via networks 292.

With further reference to FIG. 2B, refrigeration system 200 transmits rack information 225 over one or more networks to servers 280 (or other remote computer systems) or network service 282. The rack information 225 can include information obtained from performing image processing of images captured by camera array 230, where the captured images depict items placed on individual racks 118. The rack information 225 can be determined locally, on the refrigeration system 200, by the processor(s) 220. Alternatively, some or all of the rack information 225 can be determined by a remote computer, server or service. Accordingly, as described with an example of FIG. 2A, the rack information 225 includes (i) information that identifies a presence of items (e.g., bottles, beverage containers, etc.) on individual racks, (ii) information about one or more categories (e.g., type of beverage or container) or sub-categories of the individual items (e.g., type of wine (red, wine, rose, etc.), (iii) information about a state of individual items (e.g., open or uncorked, closed, previously opened, partially consumed, fill state, etc.); and/or (iv) label information for individual items (e.g., brand, vintage, trade name, information about source of origin, etc.). An end user can access content that is based on rack information 225 using, for example, a mobile device that communicates or otherwise utilizes network service 282. For example, the mobile device can execute an application ("app") that is dedicated for the network service 282, in order to view content that is at least partially based on the rack information 225. Alternatively, a user can operate a computer on which a browsing component is installed in order to view such content.

In variations, refrigeration system 200 transmits rack information 225 to user device 272 through, for example, a local wireless connection. The user device 272 can execute an application (e.g., dedicated application, browsing component, etc.) to view content that is based at least in part on the rack information 225.

In examples, the user devices 272, 274 generate rack content 235 that incorporates or is otherwise based on the rack information 225. Accordingly, the user devices 272, 274 can display content that is similar or the same as that provided on the display 228 of refrigeration system 200. In variations, the rack content 335 includes an item/rack map that shows each detected item and a corresponding rack where the item is located. Additionally, the item/rack map can identify a position along the span of the rack (along X, Z directions) where the item is detected as being located. Additionally, the rack content 235 can include detailed information about each item, including information determined from performing image processing of the respective item, as well as supplemental information. The supplemental information can include information that is not determined from the label or item itself, but rather determined from information sources based on information obtained from the label or with the item. For example, in the case of wine, the maker and vintage can be cross reference with the information repository about the particular winemaker, and the vintage year, to obtain supplemental information that includes, for example, descriptive information about how the wine was made, and particular aspects or attributes of the wine, such as awards which the wine may have one, and taste attributes of the wine which are determined by experts and not necessarily included on the label of the wine. As another example, the rack content 235 can recommend types of food that may go well with the particular wine, by referencing identifiers (e.g., vintage, maker, trade label, source of origin, etc.), categories (e.g., "burgundy", "pinot", etc.) or other aspects that are determined about the wine through image processing (e.g., by image recognition of label information) against information repositories were food recommendations are maintained.

In examples, the rack content 235 is provided as an interactive interface. For example, a user can interact with graphic representations of items identified as being present in the individual racks, in order to view supplemental information about the individual items. As an addition or variation, a user can view a listing of items which are present in the refrigeration system 200, and through interaction with a given entry of the list, receive output that indicates a rack (or rack position) where the item is being stored.

When information about an item is provided (e.g., through selection of a graphic representation of the item), examples provide for additional information about the item to be provided. The additional information can include, for example, information about the state of the item (e.g., open or uncorked, closed, previously opened, partially consumed, fill state), recommendation about how the item can be consumed (e.g., with type of food, etc.), and supplemental information.

Still further, in examples, the rack content 235 can include a list of recommendations. The list of recommendations can identify, for example, other items that may be of interest to the user based on their affinity for a particular item. For example, historical information can be maintained about items over the course of a duration, and information about preferences of the user (e.g., winemaker, wine type, vintage, aspects of the particular item, etc.) can be maintained and analyzed in order to determine preferences of the user. Based on user preferences, and or items which the user may have stored in the refrigeration system 200, the rack content 235 can provide recommendations regarding additional items which the user can purchase.

As another example, the rack content 235 can include an order interface that enables users to purchase items from a third-party source. A user can utilize the order interface to purchase a refill of a consumed item, such as a replacement wine bottle. In examples, the refrigeration system 200 can monitor items for consumption level, based on image processing that the text when items are taken offer rack in place back on it, as well as indications that an item was consumed or partially consumed. In response to detecting that an item was consumed, the rack content 335 can provide the order interface to enable the user to reorder the consumed item. As an addition or variation, the order interface can enable the user to purchase recommended items, or items which the user searches for or is otherwise provided information about.

Methodology

Figure 3C:
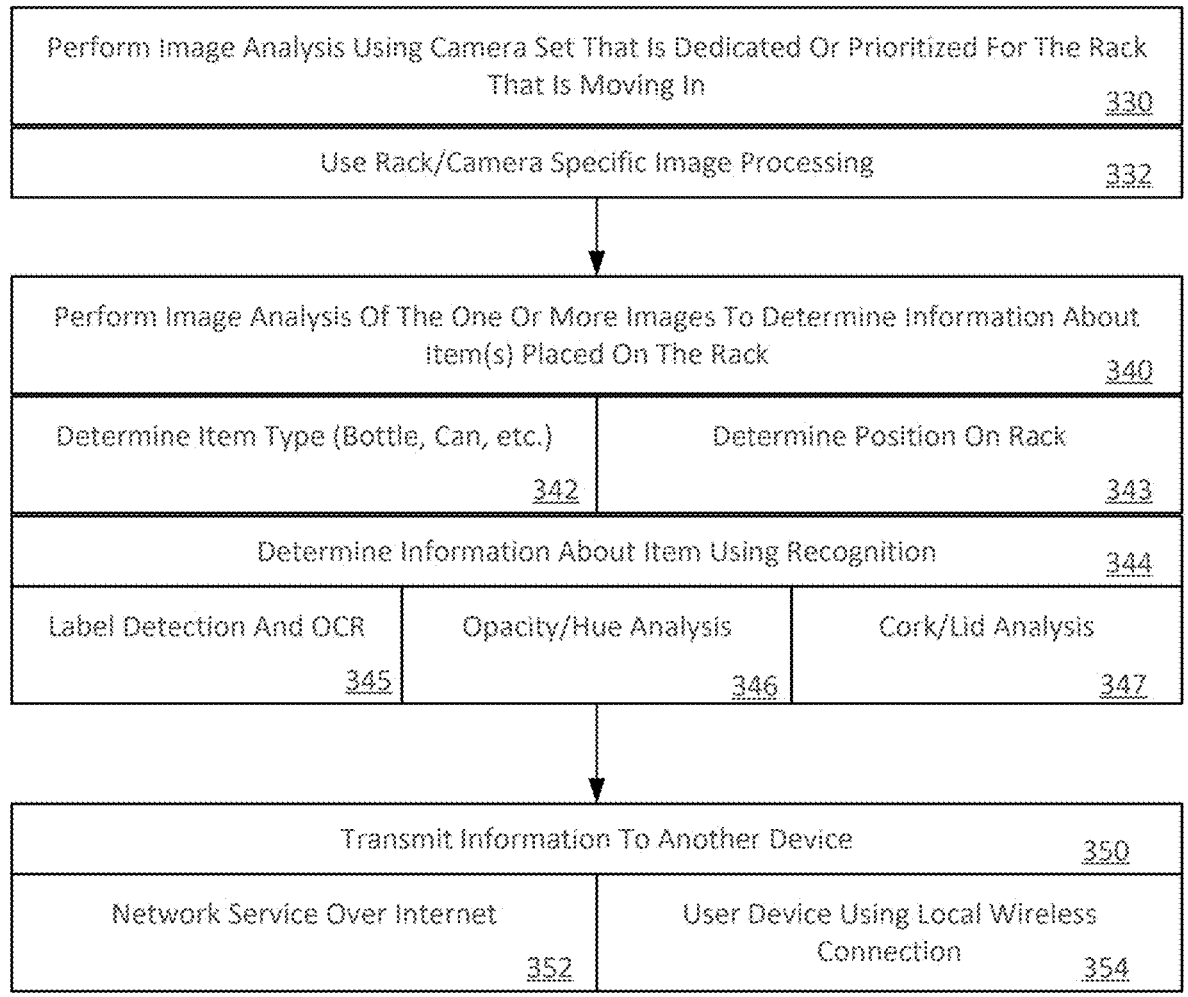

FIG. 3A through FIG. 3C illustrate example methods for operating a refrigeration system, according to one or more embodiments. In describing example methods, reference may be made to elements of FIG. 1A through FIG. 1G, FIG. 2A and/or FIG. 2B for purpose of illustrating suitable components for performing a step or sub-step being described.

With reference to FIG. 3A, in step 310, a first scan or imaging processing is performed on a first rack 118 of a refrigeration system 100, 200 when the rack 118 is positioned exterior to cabinet 110 of the refrigeration system. In step 312, a second scan or imaging processing is performed on a second rack 118 of the refrigeration system 100, 200, when the second rack is positioned exterior to the cabinet 110, where the second rack is different than the first rack. For example, the first rack may correspond to a topmost rack 118 of the refrigeration system 100, while the second rack may correspond to a middle or bottom rack 118. Each of the first and second image processing includes operations where image data, captured by corresponding cameras, is processed to enable recognition and other analysis. Thus, for example, a result of each image processing can be to generate a normalized image of a label of an item, or of the item itself. Further, the normalized image can include optimizations to enhance recognition and subsequent analysis.

In some variations, the first and second imaging processes is performed on images captured as the respective first and second racks 118, 118. As described with other examples, the first and second imaging processes can be performed when a rack is moved inward, outward, or positioned statically outside of the cabinet 110.

Further, in examples, operations of the first imaging process are different than operations of the second imaging process. The first imaging process may be performed using a first set of cameras that are of a first type, while the second imaging process is performed using a second set of cameras that are of a second type. The first and second set of cameras may be different to accommodate the different distances between the individual racks and the respective cameras. Further, the types of image processing that are performed may also be different. To perform image analysis on racks which may have relatively short separation distance from the camera lens, the image processing that is used (or prioritized) can be specifically configured for wide-lens cameras, including ultra-wide lens (or fisheye lens) cameras. Further, the image processing can use multiple cameras, where captured images are stitched into a single view.

To perform image processing on racks which have larger separations, the image processing can accommodate higher resolution and alternative lighting conditions. Thus, the number and type of cameras which are used to image different racks 118 may differ based on the proximity of the respective rack to the corresponding cameras. Additionally, the image processing can also differ based on the proximity of the cameras to the rack and/or the type of cameras in use.

With reference to FIG. 3B, in step 320, the rack of a refrigeration system 100, 200, is detected as being moved from an extended position to a seated position within interior space 114 of cabinet 110. In step 322, as the rack 118 is moved into the interior space 114, the camera array 230 captures images of the contents of the rack 118. In some implementations, the images correspond to a series of frames, such as may be captured by video.

In step 324, image analysis is initiated by the processor(s) 220 of the refrigeration system 100, 200. The processor(s) 220 can, for example, implement operations to select which images are to be analyzed for item detection, item recognition, label detection and recognition, etc. The operations can include selecting the image set to be analyzed, and more specifically, selecting which camera set of the camera array 230 to utilize for processing. In variations, the processor(s) 220 can normalize images, such as performing image stitching as needed, before transmitting the images to a remote computer or service for further processing. Still further, in other variations, the processor(s) 220 can implement operations to perform object detection and image/character recognition.

In some examples, the processor(s) 220 determines or otherwise obtains the results of the image analysis, and store the results in memory and/or generate content based on the results for the display. As an addition or variation, results are generated or otherwise provided to user devices.

In step 325, the results of the image analysis includes determination of the type of item. For example, the item can be determined by type of container (e.g., bottle, can, box, etc.), and/or by type of beverage (e.g., soda versus hard alcohol).

In step 326, the results of the analysis identifies a position of the item. The position can associate an item with a particular rack 118, as well as with a location of the item on the rack. For example, the coordinate of the item along a lateral axis (X or Z direction) can be determined. Furthermore, if the item is removed and repositioned on a rack, the new position of the item can be determined and recorded.

In step 327, information about the item is determined using recognition analysis. In some examples, the processor(s) 220 capture images and perform label detection and normalizing. Subsequent OCR and image analysis can be used to determine additional information about the beverage. In examples, label detection can be used to generate a normalized image of a label of the item, and subsequent analysis is performed to determine information about the item. The additional information can identify a type of beverage (e.g., wine, champagne, soda, etc.), one or more sub-categories of the item (e.g., color of wine), and manufacturer or brand. For wine, liquors and other specialty beverages, the information can identify a maker, a year, source (e.g., country or geographic region), and descriptive terms (e.g., alcohol content) which may be provided on the label.

With reference to an example of FIG. 3C, in step 330, the processor(s) 220 initiate and perform image processing using images captured by a camera set that is dedicated or prioritized for a rack that is in use. The rack in use can correspond to one that is in movement (e.g., moved from extended to seated position). In performing the image processing, step 332 provides that images are selected from a camera set that is optimized or otherwise configured for the particular rack. The configuration may include type of camera/lens, focus attributes, and subsequent image processing. For example, the top-most rack 118 can be imaged using (i) multiple cameras, (ii) ultra-wide lens cameras, and/or (iii) image stitching, such that images from multiple cameras can be formed into a single image for processing. While in one implementation, the images are selected and subsequently processed, in variations, images from multiple camera sets can be processed and prioritized by weighting. Thus, the processor(s) 220 and subsequent processing/analysis of images can utilize multiple camera sets, with a non-prioritized camera set providing information for specific purposes (e.g., hue analysis), edge analysis and/or determination of confidence values and assessment.

Accordingly, in step 340, image analysis is performed to determine information about the items placed on the rack 118. In some examples, the processor(s) 220 of the refrigeration system 100, 200 perform image analysis by implementing recognition algorithm locally. In variations, a remote computer system or device performs operations of the image analysis. Still further, in variations, the processor(s) 220 of the refrigeration system 100, 200 and/or the remote computer system or device performs image analysis by transmitting image data to remote systems or services, including third-party services which return recognition results.

In step 342, information is determined about the type of the item. For example, the presence of a new item on a rack is determined. Further, the type of item can be detected by type, based on or corresponding to container type (e.g., can, box, bottle, etc.) or item shape. In step 343, the position of the item on the rack 118 may be determined, where the position is based on, for example, coordinates for the rack and/or a particular slot position.

In step 344, additional information about individual items are determined from recognition operations. The recognition operations can include character image recognition, logo recognition, and/or pattern analysis of the imaged labels for each item. In step 345, label detection and analysis can be performed. The analysis can implement, for example, label detection, logo detection, image analysis (of imagery on label), optical character recognition (OCR) and/or other operations for determining information such as vintage, maker, source, type of wine and other categories.

As an addition or variation, in step 365, opacity and/or hue analysis is performed. The opacity information can be used to determine the state of the item. For example, variations in the opacity/hue of the item can reflect the fill level of the item. Still further in step 347, cork or lid recognition can be performed to determine, for example, whether the item has been opened. For example, for corks, the height of the cork above the top of a bottle can reflect whether the bottle was uncorked. Likewise, if a lid is missing a bottom portion, the lid may be deemed as having been previously opened.

In some variations, the image analysis that is performed results in an identifier of the item, and processed images of the item are stored. For example, the identifier of the item can be based in part on the label analysis. When the item is initially detected, an image of the item may be stored in association with the identifier, along with determinations about the characteristics of the hue, opacity and/or lid. In subsequent instances when the rack 118 is used, the characteristics of the hue, opacity and/or lid for the same item can be compared with the stored images to determine changes which are indicative of the item being opened (e.g., uncorked) and/or partially consumed.

According to examples, in step 350, the determinations of the image analysis is transmitted and/or rendered. In some examples, the determinations can be by the refrigeration system 100, 200, to another device using a local wireless port (step 352). In variations, the determinations can be by the refrigeration system 100, 200 to a computing device of the user, using, for example, one of the wireless communication ports 240, 242 (step 354). Still further, a remote computer system or service can make the determinations in whole or in part, and transmit the determinations to another device using a network connection.

Network Computer System

Figure 4:
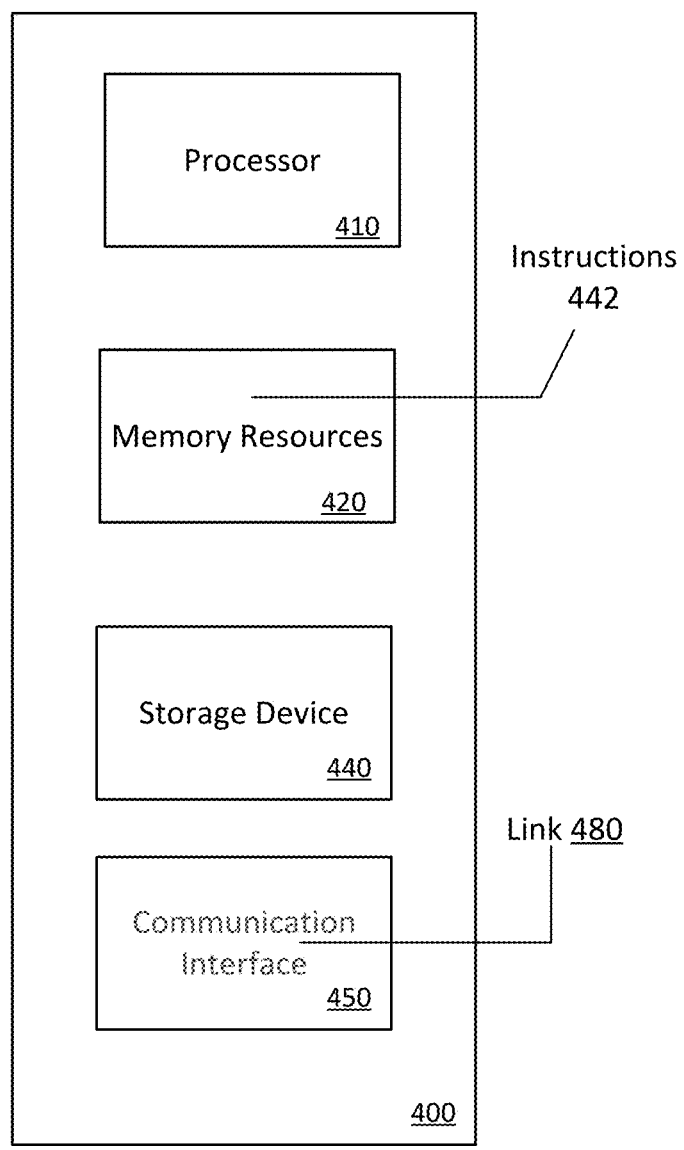
FIG. 4 illustrates a computer system on which one or more embodiments can be implemented.

FIG. 4 illustrates a computer system on which one or more embodiments can be implemented. A computer system 400 can be implemented on, for example, a server or combination of servers. For example, the computer system 400 may be implemented as part of a network communication system 300, such as described with an example of FIG. 2B. Likewise, the computer system 400 can implement operations such as described with FIG. 2A, and with steps or sub-steps of example methods such as described with FIG. 3A through FIG. 3C.

In one implementation, the computer system 400 includes processing resources 410, memory resources 420 (e.g., read-only memory (ROM) or random-access memory (RAM)), a storage device 440, and a communication interface 450. The computer system 400 includes at least one processor 410 for processing information stored in the memory resources 420, such as provided by a random-access memory (RAM) or other dynamic storage device, for storing information and instructions which are executable by the processor 410. The memory resources 420 also may be used for storing temporary variables or other intermediate information during execution of instructions to be executed by the processor 410. The computer system 400 may also include the memory resources 420 or other static storage device for storing static information and instructions for the processor 410. The storage device 440, such as a magnetic disk or optical disk, is provided for storing information and instructions.

The communication interface 450 enables the computer system 400 to communicate with one or more networks (e.g., cellular network) through use of the network link 480 (wireless or a wire). Using the network link 480, the computer system 400 can communicate a refrigeration system, user device or other computing system for implementing one or more embodiments as described. The executable instructions 442 stored in the memory resources 420 can include instructions 442, to implement a remote computer system, network service and/or network communication system (e.g., see FIG. 2B), as described with one or more embodiments. The executable instructions stored in the memory resources 420 may also implement operations for implementing steps such as described with examples of FIG. 3A through FIG. 3C.

As such, examples described herein are related to the use of the computer system 400 for implementing the techniques described herein. According to an aspect, techniques are performed by the computer system 400 in response to the processor 410 executing one or more sequences of one or more instructions contained in the memory resources 420. Such instructions may be read into the memory resources 420 from another machine-readable medium, such as the storage device 440. Execution of the sequences of instructions contained in the memory resources 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

User Device

Figure 5:
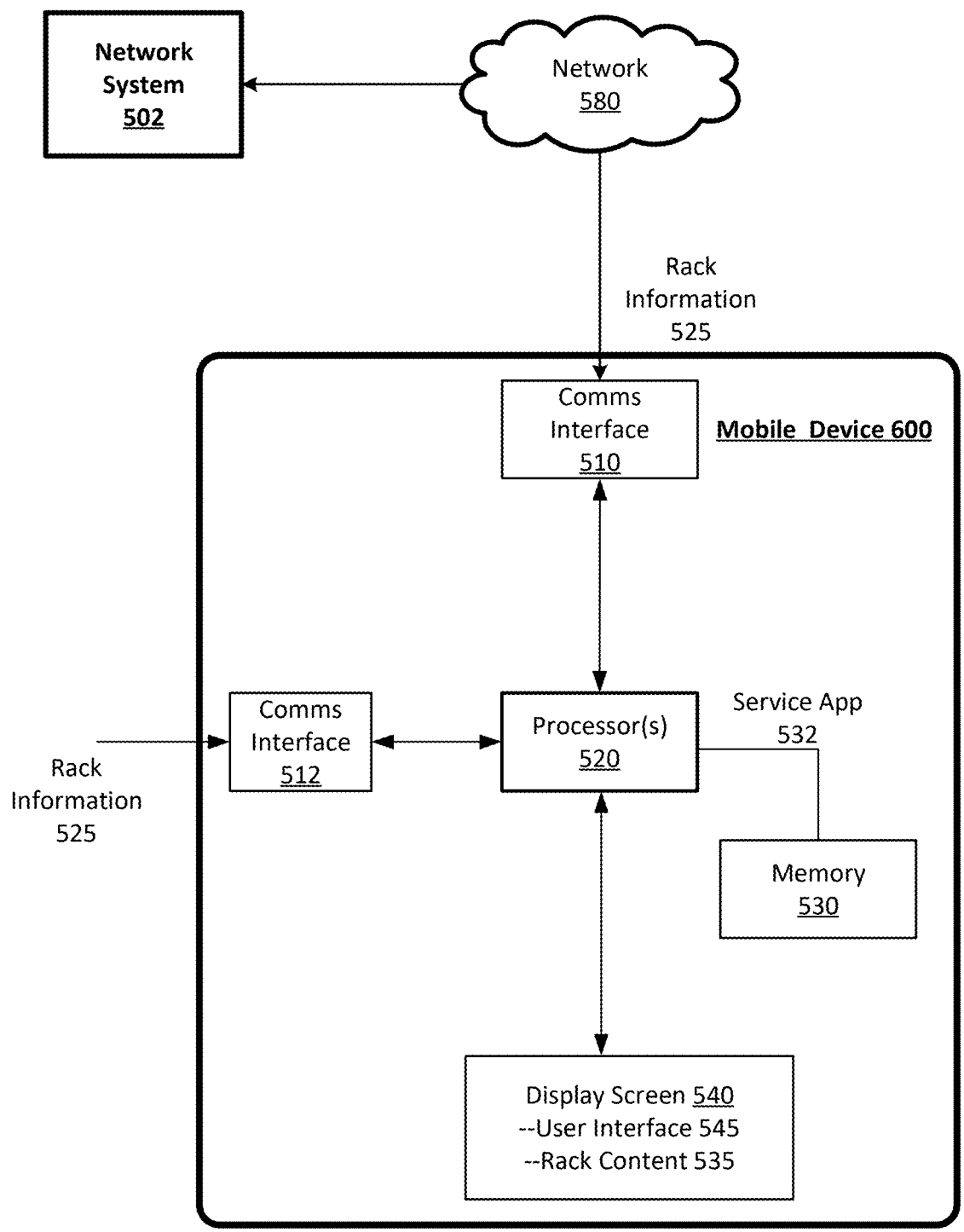
FIG. 5 is a block diagram illustrating a user device for use with embodiments as described.

FIG. 5 is a block diagram illustrating a user device for use with examples as described. In an example, a user device 500 may execute a designated service application that utilizes rack information 525 to provide rack content 535 and other information. In some examples, the user device 500 operates to communicate with a network service, through one or more networks. In many implementations, user device 500 includes a mobile computing device, such as a smartphone, tablet computer, laptop computer, VR or AR headset device, and the like. The user device 500 includes wireless communication interfaces 510, 512 to communicate with external entities using any number of wireless communication protocols. The user device 500 can receive rack information 535 from the network system 502 (or other remote computer system or device) through, for example, a wireless network interface (e.g., cellular radio, WiFi, etc.). As an addition or variation, the user device 500 can receive rack information 535 from the refrigeration system 100, 200 using a local wireless communication protocol (e.g., Bluetooth).

In certain aspects, the user device 500 stores a designated application (e.g., a service app 532) in a local memory 530. In variations, the local memory 530 can store additional applications executable by one or more processors 520 of the user device 500, enabling access and interaction with one or more host servers over one or more networks 580.

As described with various examples, the service application 532 executes on the user device 500 to generate rack information 535 on a display screen 540 of the user device 500. The rack information 535 can be displayed as part of a user interface 545, where the user interface 545 includes interactive features (e.g., menus, selectable features, search functions, etc.), and enable the consumer view their inventory of beverages, purchase additional beverages, view recommendations relating to items in their inventory and other information. Still further, in some examples, the user interface 545 can present a rack map, where items are shown by rack and, in some variations, by position on respective racks.

Beverage Cooler Enhancements

Figure 6A:
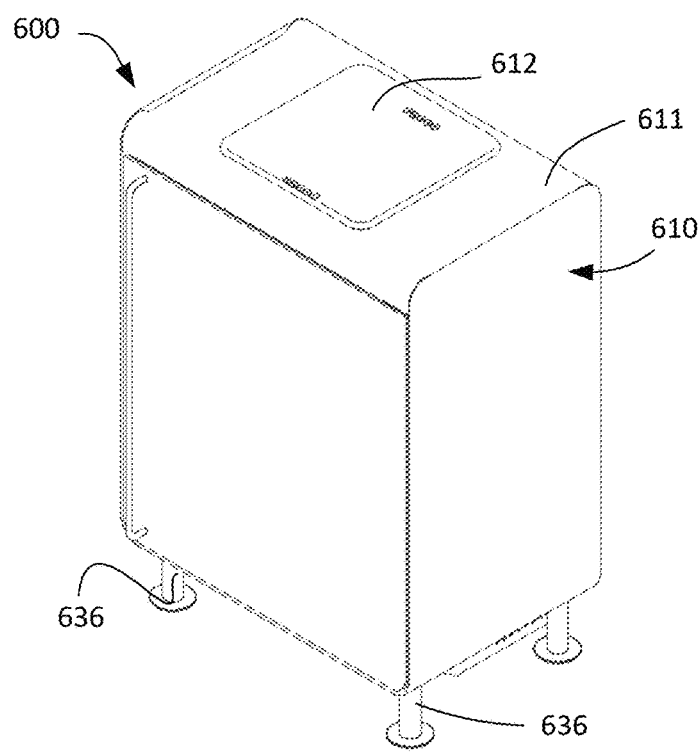
FIG. 6A through FIG. 6C illustrate an example beverage cooler, according to one or more embodiments.
Figure 6B:
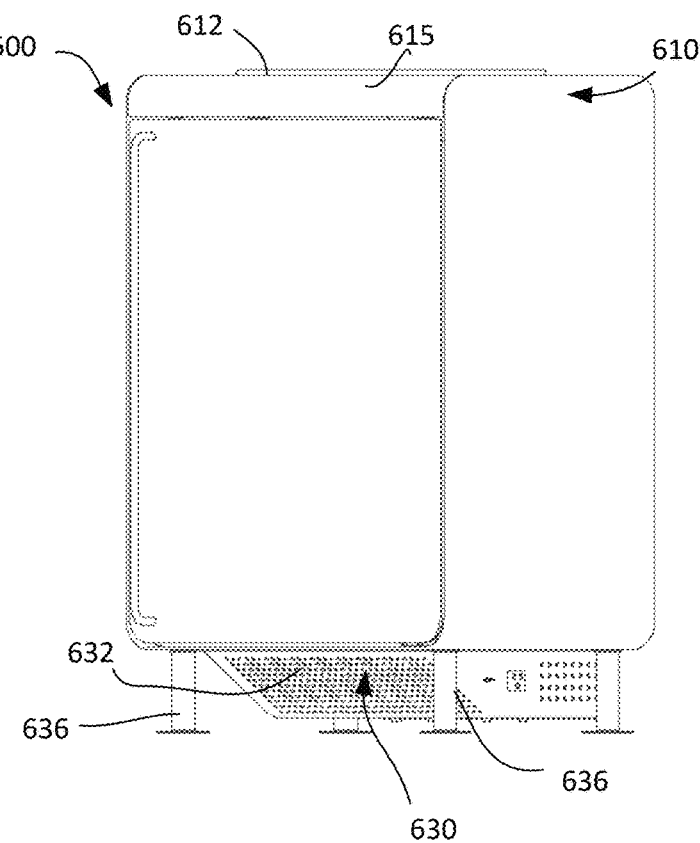
Figure 6C:
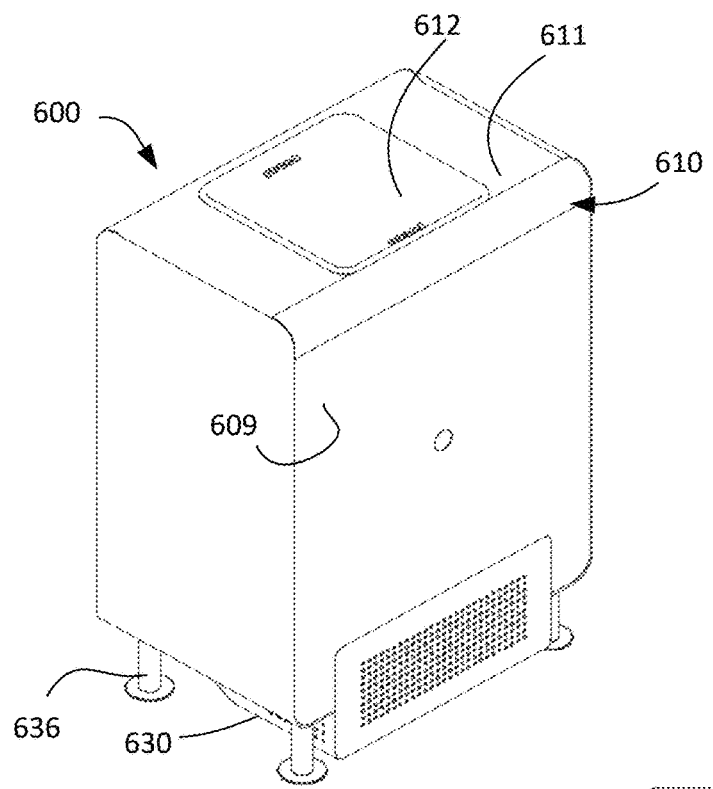

FIG. 6A through FIG. 6C illustrate an example of a beverage cooler, according to one or more examples. In examples shown, a beverage cooler 600 can include configurations that enhance or optimize the user of the beverage cooler 600. Still further, in some variations, the beverage cooler can be structured with a camera array, processor and resources to determine rack information, as described with various examples.

With further reference to examples of FIG. 6A through FIG. 6C, the beverage cooler 600 includes a housing 610, having a door 620 and door handle 612. The door inset can be mounted flush with a contoured top segment 615 of the housing 610. The door 620 can be contoured and shaped to match the cabinet 610, in such manner that the door 620 can be fully recessed and flush with respect to a facade of the top housing segment 629.

Top Tray Table

In examples, a housing 610 of the beverage cooler 600 includes an integrated tray 612, positioned on a top surface 611. Examples recognize that the beverage cooler 600 can be waist high. The integrated tray 612 can be integrated with the top surface to enable the housing 610 to serve as a flat top surface to receive items, without affecting the design or function of the beverage cooler 600. Further, the tray 612 can include a lip or other protrusion to contain items that are received on it. Additionally, in examples, the top surface 611 of the housing 610 can be shaped or structured to retain structures (e.g., outside of the tray 612). The top surface 611 can, for example, be contoured inwards or provided a lip or upward protrusion, separate from the tray 612. In some examples, the integrated tray 612 is unitarily formed (e.g., through a common manufacturing process, such as injection molding or metal pressing, with the remainder of the housing). In other examples, the tray 612 is integrated, meaning the tray can be connected (e.g., using a fastener). In such examples, the integrated tray 612 can be attached and detached from the housing 610.

Compressor Housing Segment

In examples, the beverage cooler 600 includes a compressor housing segment 630 positioned to extend from a bottom surface 613 of the housing 610. The compressor housing segment 630 can include an inclined front facade 632 that tapers the 630 inward. The housing 610 can further be lifted from the ground by legs 636. Optionally, the legs 636 can telescope to enable the vertical height of the housing 610 to be adjustable. With the housing 610 lifted by the legs 636, the inclined front facade 632 creates a void in a front region underneath the housing 610. The void can allow for presence of footing, and enable sweeping and cleaning, without adding to the overall height of the housing. Further, the front facade 632 can create a void under the compressor housing segment 630, as well as to the sides of the compressor housing segment 630. The provision for such voids allows for improved airflow from underneath the housing and to its sides.

Further, the compressor housing segment 630 can house a fan that blows warmed air outward, away from the compressor assembly. By structuring the front facade 632 to incline, the air can blow downward into the ground, rather towards the feet of a person or in other directions where the warmed air may be trapped. As the air can be blown forward (at an angle towards the ground), the beverage cooler 600 can be pushed on its rear face 609 towards a wall, without need to accommodate an airgap for the blown air. Moreover, the cabinet 610 can be fitted in tight spaces and flush-mounted under a counter or inside cabinetry, as a result of the blown air being directed forward and downward directly underneath the cabinet 610.

With reference to FIG. 6C, a rear surface 609 of the housing 610 can be mounted substantially flush to a wall or cabinet, with a back surface 609 being flat. The compressor housing segment 630 can also be flat on the back facade to eliminate or reduce separation between a backwall and the unit.

Ribbed Translucent Exterior

Figure 6D:
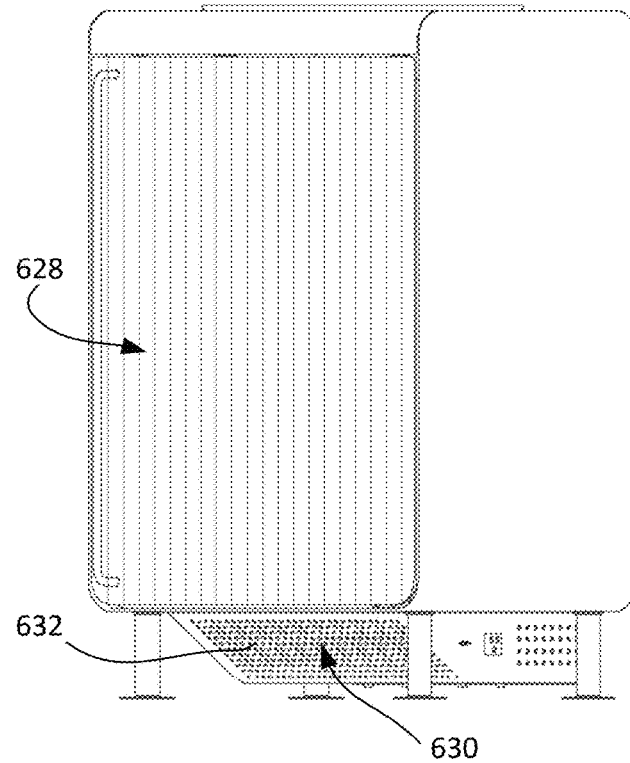
FIG. 6D illustrates an example beverage cooler with a ribbed, light-diffusive door, according to one or more embodiments.

FIG. 6D illustrates a variation in which the beverage cooler 600 includes a ribbed door 628 to promote light diffusion. In some examples, the ribbed door 628 or facade can be formed from ribbed or wavy glass or other translucent material. For example, the door 628 can be partially constructed from ridged glass (or translucent material), such as bottle glass. As an addition or variation, the door can be formed from partially opaque glass or translucent material. The use of light-diffusive material can protect certain types of items, such as vintage wines, from deterioration by light.

Reversible Rack

Figure 7A:
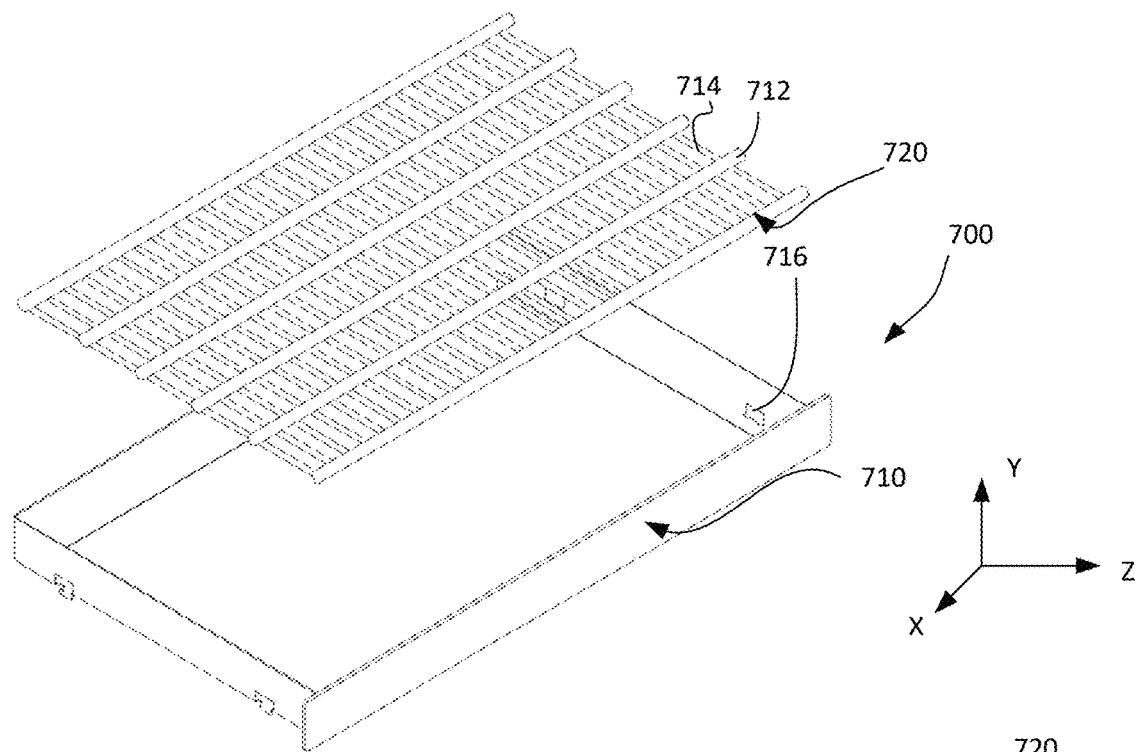
FIG. 7A and FIG. 7B illustrate a reversible rack for a refrigeration system, according to one or more embodiments.
Figure 7B:
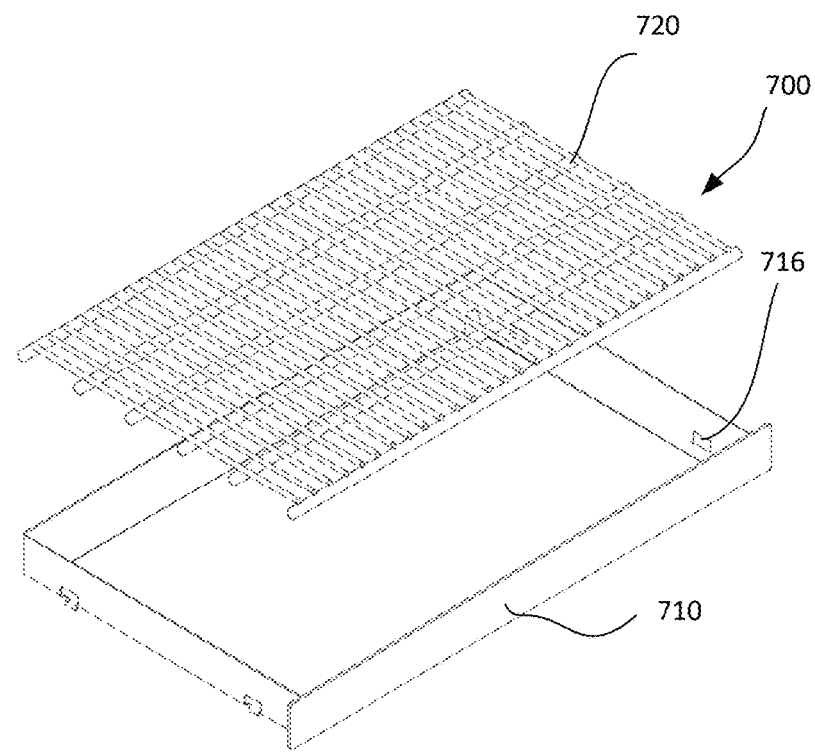

FIG. 7A and FIG. 7B illustrate a reversible rack for a refrigeration system, according to one or more examples. A rack 700 can be integrated with refrigeration systems as described with various examples, including FIG. 1A through FIG. 1G and FIG. 6A through FIG. 6D. The rack 700 includes a reversible bottom tray 720 that is retained by a rack structure 710. The tray 720 can include first and second layers 712, 714 can each include a corresponding arrangement of spaced support structures, where the spaced support structures can correspond to wires, rods, or similar typed structures. In some examples, a spacing between the support structures of the first layer 712 can be greater than the spacing between the support structures of the second layer 714. The variation in spacing can be implemented by, for example, varying the thickness of the support structures of the first layer 712 as compared to the second layer 714.

As described, tray 720 can be reversible when positioned at the bottom of the area formed by the rack structure 710. In FIG. 7A, the first layer 712 is positioned on top (relative to the second layer 714). In FIG. 7B, the second layer 714 is positioned on top. The tray 720 can be retained within the rack structure 710 by a combination of retention structures 716 (e.g., clips, shelf-support pins and bolts, etc.). For example, a user can manipulate the retention structures 716 on inside surfaces of the rack structure 710 to enable the tray 720 to be separated, flipped and inserted back again into the rack structure 710.

In an example of FIG. 7A, the first layer 712 of the tray structure 720 is top-facing. The first layer 712 can include spacing between support structures that are dimensioned to retain wine bottles. The second layer 714 can form a base structure to hold smaller bottles or items. In an example shown, the arrangement of the first layer 712 can retain wine bottles in a width-wise direction, meaning the wines can be provided on the tray 720 sideways relative to the direction of movement of the rack 700 (which can move in and out of the cabinet in the Z direction).

With reference to an example of FIG. 7B, the user can flip the tray 720 such that the second layer 714 is top-side. The second layer can support items of various dimensions, including cans or small bottles that would otherwise pass through conventional trays designed to hold wine bottles. Further, the second layer can also hold wine bottles or other similarly shaped items. However, the arrangement of the second layer 714 also enables wine bottles to be retained lengthwise relative to the movement of the rack (i.e., along Z direction).

In examples, the user can choose which side of the tray 720 to orient topside based on preference with regards to orientation of wine bottle, and/or the size or dimension of items which the tray 720 may retain. In some examples, the rack 700 can be provided as an accessory for a refrigeration system such as shown by various examples. Still further, a refrigeration system such as shown by various examples can include one or multiple racks 700.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

The invention claimed is:

1. A refrigeration system comprising:
a cabinet having an interior space;
a cooling sub-assembly to cool the interior space;
a door connected to a front side of the cabinet to seal the interior space when in a closed position, and to provide access to the interior space when in an opened position;
a rack sub-assembly mounted to an interior of the cabinet, the rack sub-assembly including a set of racks, each rack being moveable from a seated position that is fully contained within the interior space, to an extended position where at least a segment of the rack extends outside of the interior space to receive one or more items;
a camera array including one or more cameras, each of the one or more cameras being connected to a top segment of the cabinet and above a top edge of the door, wherein each of the one or more cameras is oriented such that a corresponding viewing angle of each of the one or more cameras includes a vertical space that is in front of the interior space, wherein the top edge of the door differs from the top segment of the cabinet and the top edge of the door is configured to move relative to a location of the top segment of the cabinet, and wherein the camera array includes at least one camera positioned outside of the interior space of the cabinet and oriented vertically down such that a field of view of the at least one camera is directed at a surface on which the refrigeration system is placed, and wherein the vertical space of the corresponding viewing angle includes a portion that overlaps with at least a portion of a space occupied by a thickness of the door in a closed position.

2. The refrigeration system of claim 1, wherein:
the one or more cameras of the camera array are integrated into a structure of the cabinet;
at least one of the one or more cameras are connected to an underside of a top surface of the top segment; and
the underside of the top surface to which the at least one of the one or more cameras is connected is vertically aligned with the door in the closed position.

3. The refrigeration system of claim 1, wherein the one or more cameras are attached to the cabinet as a retrofit.

4. The refrigeration system of claim 1, wherein the camera array includes one or more wide angle lenses.

5. The refrigeration system of claim 4, wherein the camera array includes at least a first wide angle lens positioned in proximity to at least a first lateral side of the interior space, and a second wide angle lens positioned in proximity to at least a second lateral side of the interior space.

6. The refrigeration system of claim 5, wherein the camera array includes at least a third lens positioned in between the first wide angle lens and the second wide angle lens.

7. The refrigeration system of claim 6, wherein the set of racks includes a first rack that is positioned in proximity to a top side of the interior space, and a second rack positioned underneath the first rack; and
wherein the camera array is operable to capture recognizable images of objects placed on the first rack using either or both of the first wide angle lens and/or the second wide angle lens.

8. The refrigeration system of claim 7, wherein the camera array is operable to capture images of objects placed on the second rack using the third lens.

9. The refrigeration system of claim 1, wherein the camera array is triggerable by movement to capture and process images.

10. The refrigeration system of claim 1, wherein the camera array is stationary as the door is moved between an open state and a closed state.

11. A method for operating a refrigeration system comprising a cabinet having an interior space and a door connected to a front side of the cabinet, the method comprising:
performing a first image scan of a first rack using a first set of cameras that are connected to a top segment of the cabinet and above a top edge of the door, the first image scan being performed when the first rack is outside of the interior space of the refrigeration system;
performing a second image scan of a second rack using a second set of cameras that are positioned at the top segment of the cabinet, the second image scan being performed when the second rack is outside of the interior space of the refrigeration system, wherein the top edge of the door differs from the top segment of the cabinet and the top edge of the door is configured to move relative to a location of the top segment of the cabinet, and wherein the first set of cameras includes at least one camera positioned outside of the interior space of the cabinet and oriented vertically down such that a field of view of the at least one camera is directed at a surface on which the refrigeration system is placed, and wherein a vertical space of the field of view includes a portion that overlaps with at least a portion of a space occupied by a thickness of the door in a closed position.

12. The method of claim 11, wherein the first set of cameras each have a first type of lens with a first viewing angle, and the second set of cameras each have a second type of lens with a second viewing angle, the second viewing angle being less than the first.

13. The method of claim 12, wherein the first set of cameras includes a first wide angle camera and a second wide angle camera, and the method further comprising stitching a first image captured by the first wide angle camera with a second image captured by the second wide angle camera.

14. The method of claim 13, wherein the second set of cameras includes a single camera that captures an image of a portion of the second rack.

15. The method of claim 11, wherein:
the first set of cameras and the second set of cameras are both integrated into a structure of the cabinet;
at least one of the first set of cameras or the second set of cameras is connected to an underside of a top surface of the top segment; and
the underside of the top surface to which the first set of cameras or the second set of cameras is connected is vertically aligned with the door in the closed position.

16. The method of claim 11, wherein at least one of the first set of cameras or the second set of cameras is attached to the cabinet as a retrofit.

* * * * *